(12) United States Patent
Yamada et al.

(10) Patent No.: US 8,798,387 B2
(45) Date of Patent: Aug. 5, 2014

(54) IMAGE PROCESSING DEVICE, IMAGE PROCESSING METHOD, AND PROGRAM FOR IMAGE PROCESSING

(75) Inventors: Hitoshi Yamada, Osaka (JP); Jun Ohmiya, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 112 days.

(21) Appl. No.: 13/521,169

(22) PCT Filed: Nov. 8, 2011

(86) PCT No.: PCT/JP2011/006229
§ 371 (c)(1),
(2), (4) Date: Jul. 9, 2012

(87) PCT Pub. No.: WO2012/063468
PCT Pub. Date: May 18, 2012

(65) Prior Publication Data
US 2012/0281922 A1 Nov. 8, 2012

(30) Foreign Application Priority Data

Nov. 11, 2010 (JP) .................. 2010-253261

(51) Int. Cl.
| | |
|---|---|
| G06K 9/40 | (2006.01) |
| G06K 9/20 | (2006.01) |
| G06K 9/32 | (2006.01) |
| H04N 5/232 | (2006.01) |
| G06T 7/20 | (2006.01) |
| G06T 7/00 | (2006.01) |
| H04N 5/14 | (2006.01) |
| G06T 5/00 | (2006.01) |

(52) U.S. Cl.
CPC ....... *H04N 5/23254* (2013.01); *H04N 5/23248* (2013.01); *H04N 5/23258* (2013.01); *G06T 7/2033* (2013.01); *G06T 7/0028* (2013.01); *H04N 5/145* (2013.01); *G06T 5/006* (2013.01)
USPC ............ 382/254; 382/289; 382/295; 382/296

(58) Field of Classification Search
None
See application file for complete search history.

(56) References Cited

U.S. PATENT DOCUMENTS

| | | |
|---|---|---|
| 6,687,386 B1 | 2/2004 | Ito et al. |
| 7,015,952 B2 | 3/2006 | Okada |

(Continued)

FOREIGN PATENT DOCUMENTS

| | | |
|---|---|---|
| EP | 1 906 140 | 4/2008 |
| EP | 1 978 731 | 10/2008 |

(Continued)

OTHER PUBLICATIONS

International Search Report issued Dec. 13, 2011 in International (PCT) Application No. PCT/JP2011/006229.

(Continued)

*Primary Examiner* — Bhavesh Mehta
*Assistant Examiner* — David F Dunphy
(74) *Attorney, Agent, or Firm* — Wenderoth, Lind & Ponack, L.L.P.

(57) ABSTRACT

An image processing device including: a motion amount estimating unit estimating a first motion amount indicating a displacement amount of a second picture with respect to a first picture; an area setting unit setting an area to be used for post-processing for each of the first picture and a first corrected picture, using feature points extracted from the first picture and the second picture; a post-processing unit generating a first cutout picture from the first picture and a second cutout picture from the first corrected picture and estimating a second motion amount indicating a displacement amount of the second cutout picture with respect to the first cutout picture; and a motion amount obtaining unit obtaining a motion amount indicating a displacement amount between the first picture and the second picture, from the estimated first motion amount and the estimated second motion amount.

14 Claims, 19 Drawing Sheets

(56) References Cited

U.S. PATENT DOCUMENTS

| | | | |
|---|---|---|---|
| 7,057,645 B1 * | 6/2006 | Hara et al. | 348/208.6 |
| 7,092,019 B1 | 8/2006 | Ogata et al. | |
| 2002/0036692 A1 | 3/2002 | Okada | |
| 2003/0171668 A1 | 9/2003 | Tsujino et al. | |
| 2005/0047544 A1 * | 3/2005 | Fu et al. | 378/63 |
| 2005/0265453 A1 * | 12/2005 | Saito | 375/240.16 |
| 2008/0136924 A1 * | 6/2008 | Washisu | 348/208.2 |
| 2008/0232645 A1 * | 9/2008 | Billinghurst et al. | 382/103 |
| 2010/0080419 A1 | 4/2010 | Okugi et al. | |
| 2010/0182480 A1 | 7/2010 | Nakajima | |
| 2010/0321510 A1 * | 12/2010 | Tsutsumi | 348/208.4 |
| 2011/0091131 A1 * | 4/2011 | Price et al. | 382/294 |
| 2011/0310262 A1 * | 12/2011 | Watanabe et al. | 348/208.1 |

FOREIGN PATENT DOCUMENTS

| | | | | |
|---|---|---|---|---|
| JP | 2000-339473 | 12/2000 | | |
| JP | 2000-341582 | 12/2000 | | |
| JP | 2001-60263 | 3/2001 | | |
| JP | 2003-250804 | 9/2003 | | |
| JP | 3679988 | 8/2005 | | |
| JP | 2007-129587 | 5/2007 | | |
| JP | 2007-228154 | 9/2007 | | |
| JP | 2010/86267 | 4/2010 | | |
| JP | 2010/165248 | 7/2010 | | |
| WO | WO 2010/100677 | * 10/2010 | | H04N 5/232 |

OTHER PUBLICATIONS

Extended European Search Report dated Mar. 7, 2014 issued in corresponding European Patent Application No. 11840213.0.

Rong Hu, et al., "Video Stabilization Using Scale-Invariant Features", pp. 871-877, 11th International Conference Information Visualization (IV'07), IEEE Computer Society (Jul. 1, 2007).

* cited by examiner

FIG. 1A
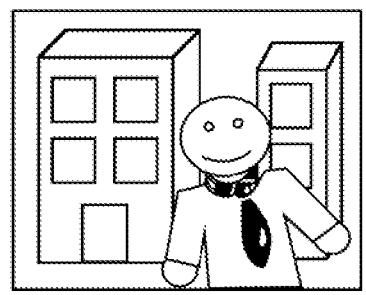
Picture t-1
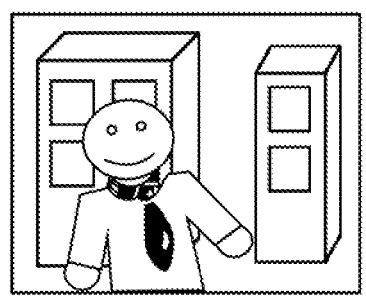
Picture t

FIG. 1B
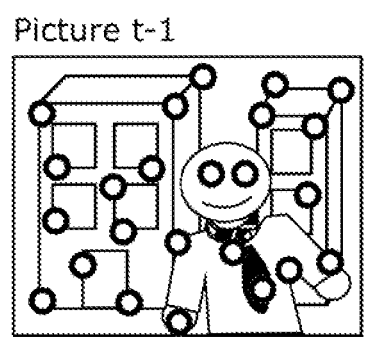
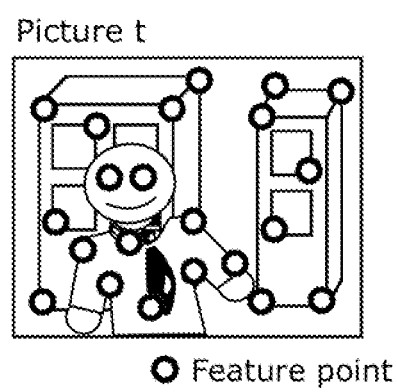

○ Feature point found in common between pictures (inlier)
△ Feature point whose position shifted between pictures
✕ Feature point not in common between pictures ▢ Predetermined area ○ Feature point found in common between pictures (inlier)
△ Feature point whose position shifted between pictures
✕ Feature point not in common between pictures ☐ Predetermined area ▨ Area for post-processing □ Extracted feature point □ Extracted feature point

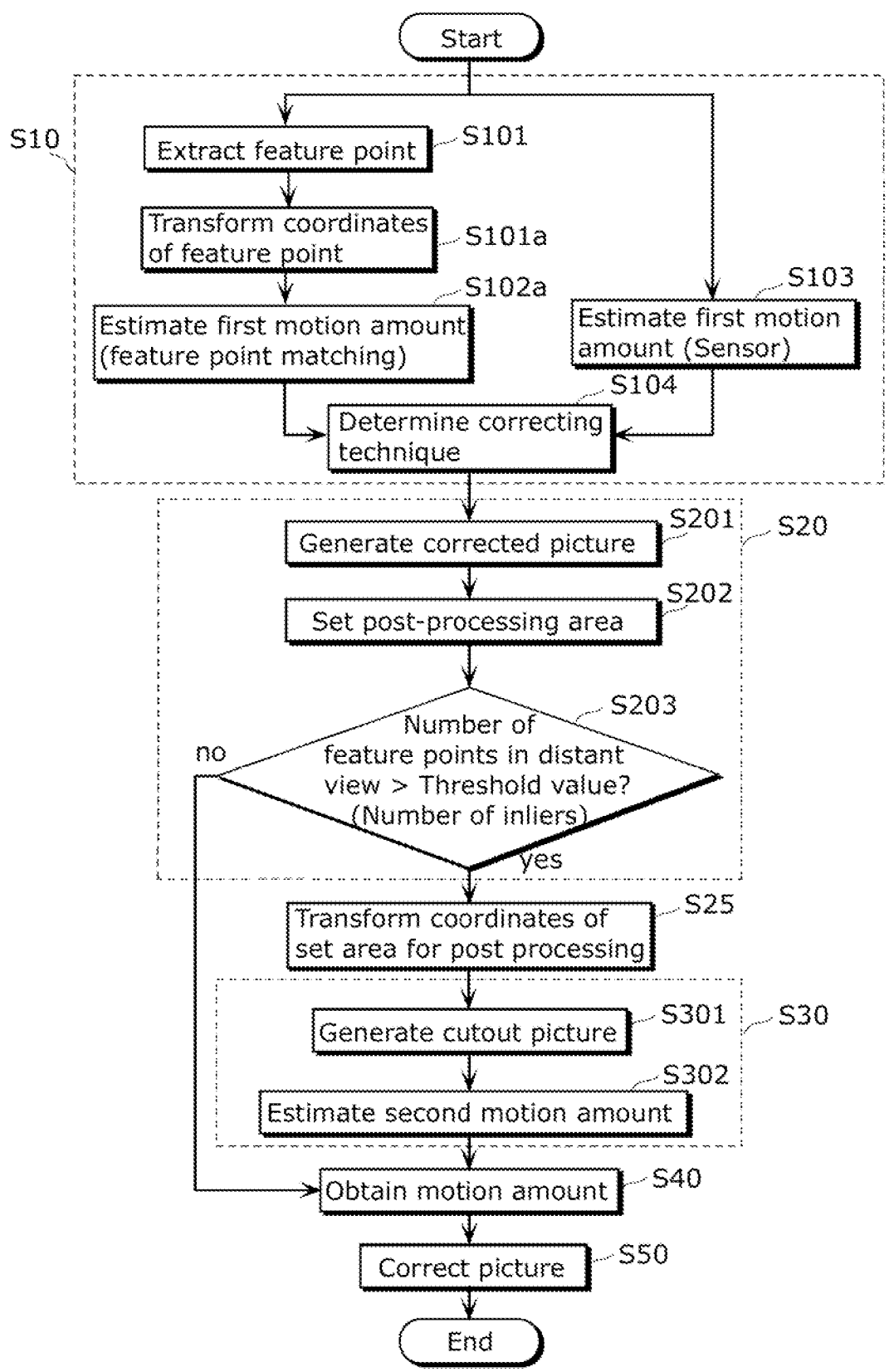

500
IMAGE PROCESSING DEVICE, IMAGE PROCESSING METHOD, AND PROGRAM FOR IMAGE PROCESSING

TECHNICAL FIELD

The present invention relates to a technique to correct an image captured with a digital still camera, a camcorder, and a wearable camera.

BACKGROUND ART

Image processing can be used as a technique to correct camera shake on an image (moving picture). For example, based on the information on an object captured in common between two pictures obtained by temporally-continuous capturing, the technique detects a motion vector used in an MPEG technique, and estimates camera shake between frames (pictures) in order to correct the shake. The technique to use the motion vector inevitably faces limitations in terms of accuracy and calculation cost, since an algorithm of the technique characteristically detects the motion vector in an area of the pictures. Such limitations require the motion-vector-based technique to previously set an upper limit of the magnitude of the camera shake. Thus, the technique cannot detect such great shake as one included in, for example, an image captured while walking and an image captured with a finder-less camera. In other words, some camera shake is too great to be corrected by the motion-vector-based technique.

In contrast, a feature-point-based matching technique is capable of correcting the shake which the motion-vector-based technique cannot correct. The matching technique uses some of the feature points on an object found in common between two pictures obtained by temporally-continuous capturing.

Specifically described here is a matching technique using feature points (also referred to as feature point matching).

FIGS. 1A to 1D illustrate a matching technique using feature points. Hereinafter, of the two pictures, the picture captured earlier is referred to as Picture t−1, and the picture captured later is referred to as Picture t FIG. 1A illustrates Picture t−1 and Picture t which is captured after Picture t−1. FIG. 1B shows feature points extracted from Picture t−1 and Picture t illustrated in FIG. 1A. FIG. 1C shows characteristic types of the feature points extracted from Picture t−1 and Picture t in FIG. 1B. FIG. 1D shows matching of the feature points extracted from Picture t−1 and Picture t in FIG. 1B. Here, the feature points are characteristic points to be detected by image processing and found on the picture.

Pixels having greater contrast on Picture t−1 and Picture t in FIG. 1A are selected as the feature points in FIG. 1B. As FIG. 1B shows, some feature points, found on corners and having significantly great contrast, are easily extracted in common from both of the pictures (Picture t−1 and Picture t). Meanwhile, some feature points whose contrast is not so great are not easily extracted from both of the pictures (Picture t−1 and Picture t).

The feature points in FIG. 1B include (i) feature points (feature points indicated in O in FIG. 1C) obtained from a common area of view between the pictures (Picture t−1 and Picture t) and (ii) feature points (feature points indicated in Δ in FIG. 1C) obtained from the common area of view between the pictures (Picture t−1 and Picture t) but their positions have shifted between the pictures (Picture t−1 and Picture t). Moreover, some of the feature points in FIG. 1B (feature points indicated in x in FIG. 1C) are obtained from areas not in common between the pictures (Picture t−1 and Picture t). Feature points to be matched among the feature points in FIG. 1B are the ones (feature points indicated in O in FIG. 1C) obtained from the common area of view between the pictures (Picture t−1 and Picture t).

Before the matching, however, it is impossible to find the positions and the ratio of the numbers of the feature points obtained from the common area of view between the pictures (Picture t−1 and Picture t). Hence, it is also impossible to find which feature points are obtained from the common area of view between the pictures (Picture t−1 and Picture t). Thus, a technique such as the Random Sample Consensus (RANSAC) is used to select pairs of feature points from the feature points extracted from Picture t−1 and the feature points extracted from Picture t, and calculate an evaluation value of each pair of feature points based on a preset evaluation function (FIG. 1D). The evaluation value is designed to be likely to increase when the obtained pair (hereinafter referred to as inlier) of feature points is from the common area of view between the pictures (Picture t−1 and Picture t)

Specifically, a rotation matrix is calculated from a combination of two pairs of feature points selected among the feature points extracted from Picture t−1 and the feature points extracted from Picture t. In order to recalculate to find out whether or not the calculated rotation matrix is correct, the calculated rotation matrix rotates feature points included in Picture t−1 and representing other than the feature points of the selected pairs. Then, the rotated feature points in Picture t−1 are checked whether or not the rotated feature points match the feature points in Picture t. Searches are conducted for predetermined times based on the evaluation function. Once the searches are conducted for the predetermined times, the searches are terminated, and a rotation matrix is estimated based on the inlier having the largest evaluation value at the moment of the termination. It is noted that the inlier is a feature point found in common between pictures, such as the feature points indicated in O in FIG. 1C. Such feature points are obtained mainly from a distant view area in a captured picture. Then, the shake in the pictures is corrected, using the rotation matrix estimated based on the inlier; that is, feature points in a distant view. The area in a distant view is the background in a captured picture, which shows part of the picture appearing in a long distance.

That is how typical matching is conducted based on the feature points. In other words, the feature point matching involves the operations below. First, shake developed between pictures (Picture t−1 and Picture t) is repetitively searched so that the distribution of feature points in Picture t−1 and the distribution of feature points in Picture t match with each other as much as possible. Here, the matching feature points in Picture t−1 and Picture t appear in a common area between the Picture t−1 and Picture t. Then, a shake amount between the pictures (Picture t−1 and Picture t) is estimated as the motion amount that is calculated when the distributions of the feature points obtained in the common area between Picture t−1 and Picture t match with each other at the greatest degree. The feature point matching is carried out to continuously estimate the shake amount developed between the pictures (frames) for each picture in order to correct the shake on an image (every picture) based on the estimated shake amount.

Moreover, as characteristics of a typical algorithm, the feature point matching is based on the similarity between pictures (frames) in feature point distribution. Thus, the feature point matching has an advantage over the motion-vector-based technique carried out using partial area information of a picture, since the feature point matching is low in calculation cost. Furthermore, the feature point matching is capable of matching, using feature points throughout a picture. Consequently, the matching technique can estimate a rather great amount of shake. Hence, the use of the feature point matching makes it possible to estimate a great shake included in an image captured while walking and an image captured with a finder-less camera. In other words, the feature point matching can correct camera shake which is too great to be corrected by the motion-vector-based technique.

The feature point matching, however, has a problem in that the estimation accuracy of the shake amount is not high enough. In other words, the feature point matching involves estimating a shake amount (displacement amount between pictures) based on a feature point position on the picture. This results in a problem that the estimated shake amount between frames (between pictures) is not accurate enough once a shift is made in the position of the feature point used for estimating the shake amount between the frames (between pictures).

The shift in the feature point position between the frames (between pictures) can develop when some kind of changes appear between the frames (between pictures), such as a change in lighting condition, in short distance view, and in view due to the motion of the camera. Such a shift is inevitable in capturing pictures. The feature point matching can correct most of the shake between the frames (between pictures); however, the technique leaves a little shake in the frames when the estimation accuracy decrease as a result of the shift in the feature point position. Unfortunately, the user is acutely aware of such a little shake, and takes that the picture is shaking.

Hence, it is essential to introduce techniques to improve estimation accuracy of the feature point matching. One of such techniques employs extra post-processing after the feature point matching in order to improve the accuracy. For the post-processing, two techniques are designated as candidates: One is to use a sensor, and the other is to utilize image processing. Unfortunately, some images suffer from an impact of walking, such as an image captured while walking. In using a sensor, the impact affects the sensor, which results in decrease in estimation accuracy. Taking such a situation into consideration, it is desirable to utilize the image processing to provide the post-processing. In other words, it is desirable to estimate in high accuracy a shake amount of the image by providing the extra image processing after the feature point matching, so that the image processing can interpolate the decrease in the estimation accuracy of the feature point matching. Such image processing techniques for the post-processing may include, for example, a technique to detect a motion vector and a technique to trace a specific object. The techniques are based on the fact that even though the originally developed shake is large, the amount of the shake becomes as small as an error after the correction based on the feature point matching. Thus, it is realistic to apply the motion vector detecting technique.

When the post-processing based on the image processing is utilized to compensate the decrease in the estimation accuracy of the feature point matching, significantly essential is which area in the image is used for the image processing as the post-processing. The reason why the area is essential derives from captured various objects in a picture. Here, in estimating the shake amount through the post-processing based on the image processing, an inappropriately-set area could even decrease the estimation accuracy.

Hence, selecting an appropriate area is essential when the image processing is employed to estimate the shake amount. Some techniques have been proposed to select such an appropriate area. For example, a technique disclosed in Patent Literature 1 is used when there is a specific object previously found in a picture. The technique sets, as a shake-amount estimating area, the area in which a picture feature unique to the specific object is extracted. Techniques disclosed in Patent Literatures 2 and 3, for example, involve detecting a vanishing point in a picture and setting, as a shake-amount estimating area, the area around the vanishing point.

CITATION LIST

Patent Literature

[PTL 1]
Japanese Unexamined Patent Application Publication No. 2003-250804
[PTL 2]
Japanese Unexamined Patent Application Publication No. 2000-339473
[PTL 3]
Japanese Patent No. 3679988

SUMMARY OF INVENTION

Technical Problem

The above conventional techniques could be applied as post-processing for compensating the decrease in the estimation accuracy of the feature point matching; however, the techniques cannot correct in high accuracy the shake in an image.

Specifically, the technique in Patent Literature 1 of using the specific object could be applied as the post-processing. Unfortunately, the technique cannot correct the shake in the image in high accuracy. This is because, as assumed in an image captured while walking for example, the specific object is not always expected to be found in an obtained image.

The techniques in Patent Literatures 2 and 3 of detecting a vanishing point in a picture could be applied as the post-processing. Unfortunately, the techniques cannot correct the shake in the image in high accuracy. This is because the calculation cost is relatively high for obtaining vanishing points. Depending on a captured object, such a high cost prevents some vanishing points from being detected. As assumed in an image captured while walking, for example, the vanishing points are not always detected. Consequently, the techniques cannot necessarily correct the shake in the image in high accuracy.

The above conventional techniques could be applied as the post-processing for compensating the decrease in the estimation accuracy of the feature point matching. In some cases, however, the criterion in using which area for the post-processing is unknown. This unknown criterion prevents correction of shake in an image in high accuracy.

The present invention is conceived in view of the above problems and has an object to provide an image processing device, an image processing method, and a program for the image processing method which are capable of correcting in high accuracy a shake amount between pictures obtained by temporally-continuous capturing.

Solution to Problem

In order to achieve the above object, an image processing device according to an aspect of the present invention corrects displacement between pictures obtained by temporally-continuous capturing. The image processing device includes: a motion amount estimating unit which estimates a first motion amount indicating a rotational displacement amount of a second picture with respect to a first picture, the rotational displacement amount being obtained based on a combination of axis rotational directions of mutually perpendicular three axes, and the second picture being captured temporally after the first picture; an area setting unit which sets an area to be used for post-processing for each of the first picture and a first corrected picture, using feature points extracted from the first picture and the second picture, the first corrected picture being generated from the second picture whose displacement is corrected using the estimated first motion amount; a post-processing unit which performs the post-processing, by generating a first cutout picture and a second cutout picture and estimating a second motion amount indicating a displacement amount of the second cutout picture with respect to the first cutout picture, the first cutout picture being generated from the area set in the first picture and the second cutout picture being generated from the area set in the first corrected picture; and a motion amount obtaining unit which obtains a motion amount indicating a displacement amount between the first picture and the second picture, from the estimated first motion amount and the estimated second motion amount.

This structure makes it possible to set a suitable area to be used for the post-processing, based on an inlier, of feature points in a long distance view, used when the first motion amount (rotational motion amount) is estimated. This feature implements an image processing device which successfully corrects in high accuracy a shake amount between multiple pictures obtained by temporally-continuous capturing.

It is noted that, instead of being implemented as such a device, the present invention may be implemented as an integrated circuit including the processing units included in the device, a method including the processing units included in the device as steps, a program to cause a computer to execute such steps, and information, data, and signals showing the program. Such a program, information, data, and signals may be distributed via a recording medium such as a CD-ROM and a communications medium such as the Internet.

Advantageous Effects of Invention

The present invention can implement an image processing device, an image processing method, and a program which successfully correct in high accuracy a shake amount between multiple pictures obtained by temporally-continuous capturing.

Specifically, the image processing device, the image processing method, and the program according to an implementation of the present invention successfully correct in high accuracy shake of an image by setting an area for post-processing in image processing, using feature points in a long distance view (inlier) used when a rotational motion amount is estimated.

BRIEF DESCRIPTION OF DRAWINGS

FIG. 1A illustrates a matching technique using feature points.
FIG. 1B illustrates the matching technique using feature points.
FIG. 15 depicts a flowchart showing a flow of processing by the image processing device according to Embodiment 3 of the present invention.

DESCRIPTION OF EMBODIMENTS

Described hereinafter are the embodiments of the present invention with reference to the drawings.

Embodiment 1

Figure 1C:
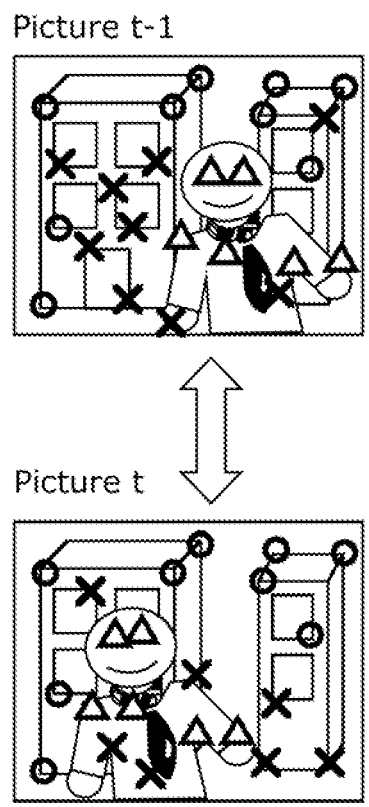
FIG. 1C illustrates the matching technique using feature points.
Figure 1D:
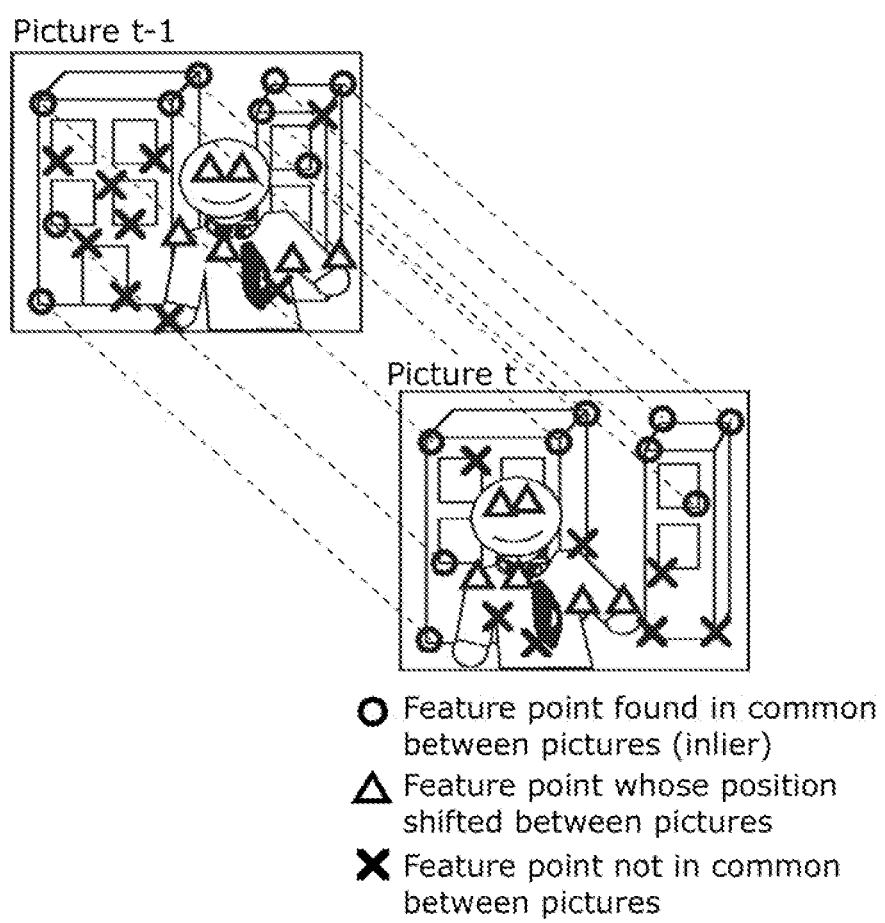
FIG. 1D illustrates the matching technique using feature points.
Figure 2:
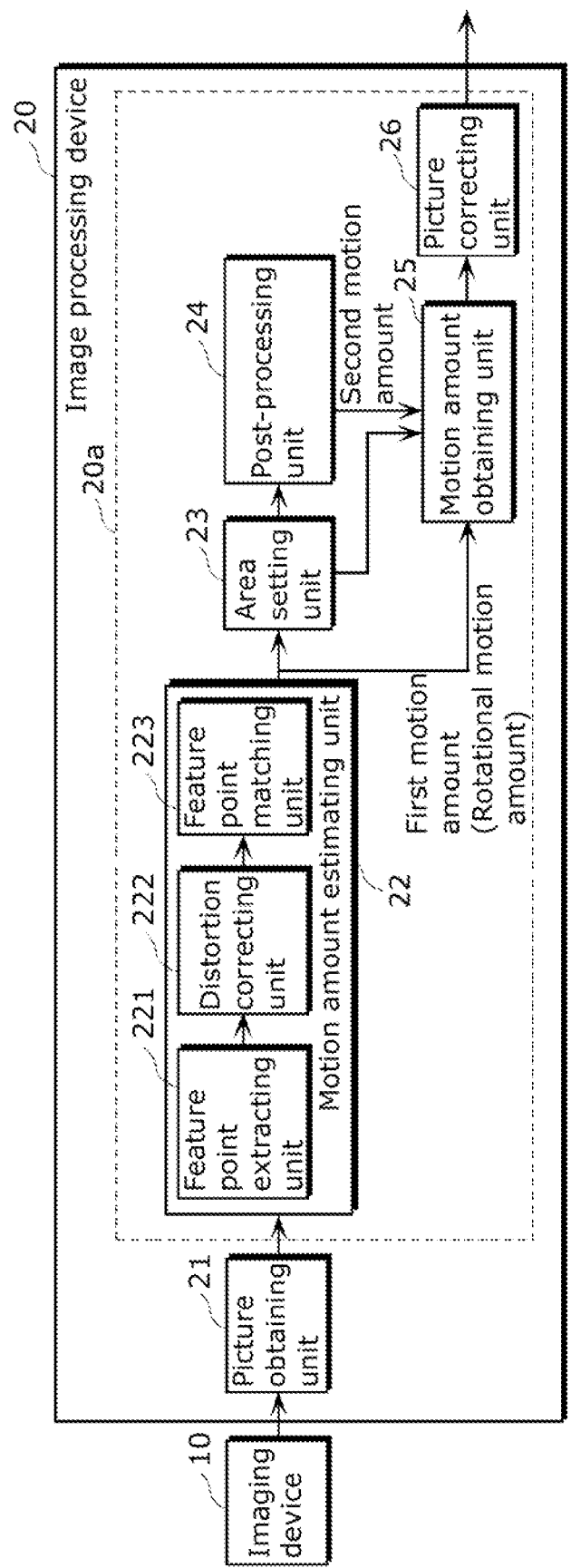
FIG. 2 depicts a block diagram showing an overall structure of an image processing device according to Embodiment 1 of the present invention.

FIG. 2 depicts a block diagram showing an overall structure of an image processing device according to Embodiment 1 of the present invention.

An imaging device 10 is, for example, a camera such as a digital still camera and a digital camcorder. The imaging device 10 includes imaging devices such as a charge-coupled device (CCD) sensor and a complementary metal-oxide semiconductor (CMOS) sensor, and captures an image and provides the image in the form of electric signals.

An image processing device 20 corrects displacement between pictures obtained by temporally-continuous capturing. The image processing device 20 includes an image processing unit 20a and a picture obtaining unit 21.

The picture obtaining unit 21 obtains picture data to be processed. Specifically, among the pictures obtained by temporally-continuous capturing with the imaging device 10, the picture obtaining unit 21 obtains picture data for two of the pictures. The two pictures are a first picture (Picture t−1) and a second picture (Picture t) captured temporally after the first picture (Picture t−1).

Here, Picture t−1 and Picture t exemplify the first picture and the second picture, respectively. For the sake of simplification, time-wise, Picture t−1 (first picture) is assumed to be captured immediately before Picture t (second picture), and Picture t is assumed to be captured immediately after Picture t−1. The image data for Picture t−1 and Picture t may be compression-coded by a typical JPEG technique and may be recorded in the form of a video such as MPEG-4.

The image processing unit 20a includes a motion amount estimating unit 22, an area setting unit 23, a post-processing unit 24, a motion amount obtaining unit 25, and a picture correcting unit 26. The image processing unit 20a processes the picture data obtained by the picture obtaining unit 21.

The motion amount estimating unit 22 includes a feature point extracting unit 221, a distortion correcting unit 222, and a feature point matching unit 223. The motion amount estimating unit 22 estimates a rotational motion amount of the second picture with respect to the first picture. Here, the rotational motion amount is a rotational displacement amount obtained based on the combination of axis rotational directions of mutually perpendicular three axes. The second picture is captured temporally after the first picture.

The feature point extracting unit 221 extracts feature points from each of the first picture and the second picture. Specifically, the feature point extracting unit 221 receives Picture t−1 and Picture t obtained by the picture obtaining unit 21, extracts the feature points of the obtained Picture t−1 and Picture t, and generates feature point data t−1 and feature point data t from the extracted feature points.

Here, the feature points show features found on a picture and detectable by the image processing. The feature points include a point where a vertical sharp edge and a horizontal sharp edge in a picture intersect with each other, and a point where two strong edges each extending in a different direction are found near a local. A desirable feature point (inlier) is to be stably detected (estimated) among points found in common between the two pictures; namely, temporally continuous Picture t−1 and Picture t. When the feature point extracting unit 221 extracts feature points, however, an accurate positional relationship between Picture t−1 and Picture t is unknown. Hence, some kinds of criteria are essential in order to extract common feature points.

Described hereinafter is a criterion used for extracting the common feature points.

When Harris is used for extracting feature points, for example, extracted are corner points where vertical and horizontal edges intersect with each other with respect to an edge of a picture.

Specifically, the feature point extracting unit 221 extracts the corner points by calculating a feature point score, which represents an intersection of the edges, for each pixel. In theory, a feature point score is calculated by feature point extracting unit 221 for each of the pixels. However, when the image processing device 20 is in an environment having a resource limit such as an embedded system, there can be an upper limit to the number of feature points to be used for matching by the feature point matching unit 223 in the later stage. Taking the upper limit into consideration, it is not desirable for the feature point matching unit 223 to use all the feature points calculated by the feature point extracting unit 221 to perform matching processing, in terms of a calculation cost and calculation accuracy. Hence, desirable matching processing is performed based on a specific number of feature points determined in descending order of feature point scores.

Described hereinafter is the reason why it is desirable to adopt a specific number of feature points determined in descending order of feature point scores. An edge used in Harris reflects a variation in contrast (luminance value) of a picture. Thus, when a variation in a lighting condition is small, the contrast in the picture is held and the edge does not disappear. In other words, the edge is less likely to disappear between pictures (between picture frames) unless the edge is covered by an obstacle and thus the edge itself disappears. Consequently, a point having a higher feature point score based on edge information is likely to be found as a feature point in common between Picture t−1 and Picture t.

Hence, in using a feature point score as an criterion for extracting the common-feature point, the feature point extracting unit 221 extracts a feature point having a higher score than a specific threshold value. Here, when the feature point score is used to extract a feature point, the specific threshold value may be a value at an average score in a picture or a value determined based on a temporal average score among multiple pictures. Moreover, the specific threshold value does not have to be the only threshold value in the entire picture; instead, a threshold value may be generated for each area. Furthermore, the threshold value to be generated for each area may be determined based on a single picture or may be determined among multiple pictures arranged in a time order.

In addition, the feature point score may be determined based on a score of an object under some sort of object recognition.

It is noted that typical techniques other than the above one for the feature point extracting unit 221 include Scale-Invariant Feature Transform (SIFT) and Speeded Up Robust Features (SURF).

The distortion correcting unit 222 corrects distortion (i) developed due to optical strain of an optical system used for capturing and (ii) found between the feature points of the first picture and the feature points of the second picture. Here, the feature points are extracted by the feature point extracting unit 221. Here, the distortion develops due to the optical strain of the optical system used for capturing multiple pictures, and found with coordinates of a feature point included in the captured pictures.

It is noted that the distortion due to the optical strain based on the optical system used for capturing does not have to be corrected. In such a case, the motion amount estimating unit 22 does not include the distortion correcting unit 222. The motion amount estimating unit 22 causes the feature point extracting unit 221 to directly provide, to the feature point matching unit 223, feature points found in the first picture and the second picture and extracted by the feature point extracting unit 221.

The feature point matching unit 223 matches the feature points of the second picture and the feature points of the first picture with each other to estimate the rotational motion amount indicating the rotational displacement amount of the second picture with respect to the first picture. The rotational displacement amount is obtained based on the combination of axis rotational directions of mutually-perpendicular three axes. The feature points of first picture and the feature points of the second picture have distortion corrected by the distortion correcting unit 222.

Specifically, the feature point matching unit 223 matches the feature point data t of Picture t and the feature point data t−1 of Picture t−1 with each other; that is, the feature point matching unit 223 estimates a corresponding relationship between the feature point data t−1 and t. Here, the feature point data t−1 is extracted by the feature point extracting unit 221 from Picture t−1 in the previous frame period, and stored in, for example, a memory 224. The feature point data t is extracted by the feature point extracting unit 221 from Picture t in the current frame period. Here, the rotational motion amount indicates the rotational displacement amount obtained based on the combination of axis rotational directions of mutually-perpendicular three axes (three-axis rotational directions), and includes after-described rotational components of roll, pitch, yaw.

Based on the feature point data t−1 and the feature point data t, the feature point matching unit 223 estimates a rotation matrix indicating a camera motion occurring between Picture t−1 and Picture t. Here, the rotation matrix is calculated by a technique such as RANdom Sample Consensus (RANSAC). Derived from the rotation matrix are the rotational components of roll, pitch, yaw representing an amount of camera shake developed between the frames; namely, between the pictures. It is noted that in the case where the estimation of the rotation matrix fails, a 0 is set to roll, pitch, yaw. Thus, no rotation is assumed between the pictures.

When the motion amount estimating unit 22 does not include the distortion correcting unit 222, the feature point matching unit 223 directly matches the feature points, of the first and second pictures, extracted by the feature point extracting unit 221. In other words, the feature point matching unit 223 matches the feature points of the first picture and the feature points of the second picture with each other to estimate the rotational motion amount indicating the rotational displacement amount, of the second picture with respect to the first picture, obtained based on the combination of the three-axis rotational direction. Here, the feature points are extracted by the feature point extracting unit 221.

That is how the motion amount estimating unit 22 is structured.

Figure 3:
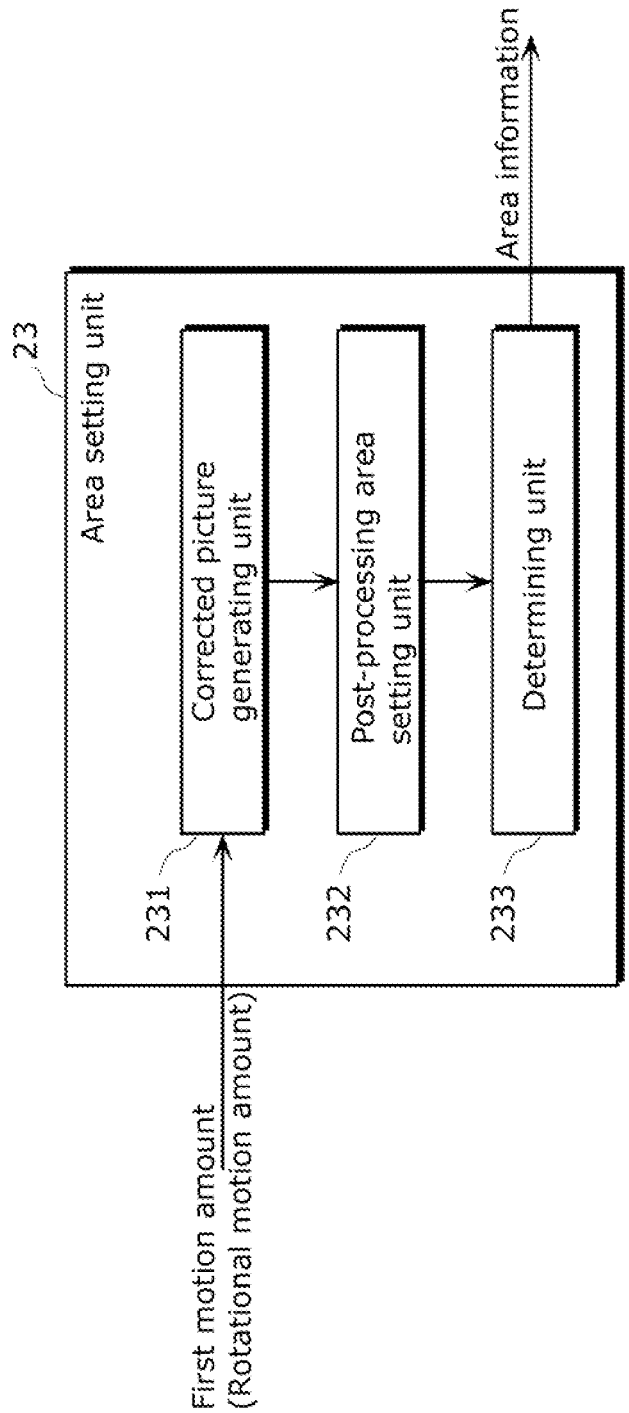
FIG. 3 depicts a block diagram showing a structure of an area setting unit according to Embodiment 1 of the present invention.

As shown in FIG. 3, the area setting unit 23 includes a corrected picture generating unit 231, a post-processing area setting unit 232, and a determining unit 233. Based on the feature points extracted from the first and second pictures, the area setting unit 23 sets an area to be used for post-processing. Here, the area is set for each of (i) the first picture and (ii) a first corrected picture generated from the second picture whose displacement is corrected based on the estimated rotational motion amount. Specifically, the area setting unit 23 sets an area to be used for post-processing for each of the first picture and the first corrected picture. The area is set using feature points (i) found among the feature points extracted from the first picture and the second picture, and (ii) used for estimating the first motion amount by the motion amount estimating unit 22. Here, the feature points used for estimating the first motion amount is an inlier. In other words based on the inlier, of the feature points in a distant view on Picture t, obtained by the feature point matching unit 223, for example, the area setting unit 23 sets the area to be used by the post-processing unit 24 for estimating the motion amount.

FIG. 3 depicts a block diagram showing a structure of the area setting unit 23 according to Embodiment 1 of the present invention.

The corrected picture generating unit 231 generates the first corrected picture from the second picture whose displacement is corrected using the first motion amount estimated by the motion amount estimating unit 22. In other words, based on the rotational motion amount (the rotation matrix, for example) estimated by the feature point matching unit 223, the corrected picture generating unit 231 generates the first corrected picture from the second picture whose displacement, extending in the combination of the three-axis rotational directions, is corrected.

The post-processing area setting unit 232 sets an area for each of the first picture and the first corrected picture, using first feature points (i) found among the feature points extracted from the first picture and the second picture and (ii) used for estimating the first motion amount by the motion amount estimating unit 22.

The determining unit 233 determines whether or not the number of the first feature points, included in the area for the first corrected picture, is greater than or equal to a threshold value. In the case where the determination result shows that the number is greater than or equal to the threshold value, the determining unit 233 determines that the inliers in the area are feature points in a distant view, and sets the area as an area to be used for the post-processing.

Described hereinafter is the reason why the area setting unit 23 sets the area to be used by the post-processing unit 24, based on the inliers obtained by the feature point matching unit 223 and indicating the feature points in a distant view on Picture t.

In the case where the feature point matching unit 223 estimates a perfectly correct shake amount between pictures (frames), the value of the estimated shake amount has no error. Thus, the coordinates of the inliers between Picture t−1 and Picture t correspond to each other. In reality, however, there is an error in the coordinates of the inliers between Picture t−1 and Picture t. Such an error needs to be corrected by the post-processing unit 24. Hence, the area setting unit 23 sets an area to be used by the post-processing unit 24.

In addition, when matching is successful, the inliers obtained by the feature point matching unit 223 are highly likely the feature points extracted from a distant view area found in common between the frames (between pictures). Thus, the area setting unit 23; namely the post-processing area setting unit 232, uses the inliers to set, in the distant view area, the area to be used by the post-processing unit 24 for the post-processing.

Described next is the reason why an area is set in the distant view area for the post-processing by the post-processing unit 24. Suppose an area is set in a near view area for the use of post-processing by the post-processing unit 24. The post-processing unit 24 inevitably estimates the motion of the object, not the motion of the camera. Thus, the post-processing unit 24 cannot correctly estimate the amount of camera shake developed between the frames (between pictures). In contrast, suppose an area is set in a distant view area for the post-processing by the post-processing unit 24. Here, the post-processing unit 24 estimates a motion of the back ground area having the same magnitude of and appearing in a direction opposite the camera. Consequently, the post-processing unit 24 can correctly estimate the camera shake amount. Thus, it is suitable to set an area in a distant view area for the post-processing by the post-processing unit 24.

It is noted that inliers obtained by the feature point matching unit 223 are highly likely the feature points in the distant view area; however, some inliers might not stochastically be the feature points in the distant view area due to the setting of an evaluation function by RANSAC. Thus, in order to make the inliers to be feature points in the distant view area, the area to be set for the post-processing by the post-processing area setting unit 232 needs to be highly likely found in the distant view area. In other words, based not on a single inlier but on a certain number of inliers or more, the area setting unit 23; namely the post-processing area setting unit 232, sets an area to be used for the post-processing by the post-processing unit 24 in a distant view area between the first picture (Picture t−1) and the first corrected picture (corrected Picture t)

Figure 4:
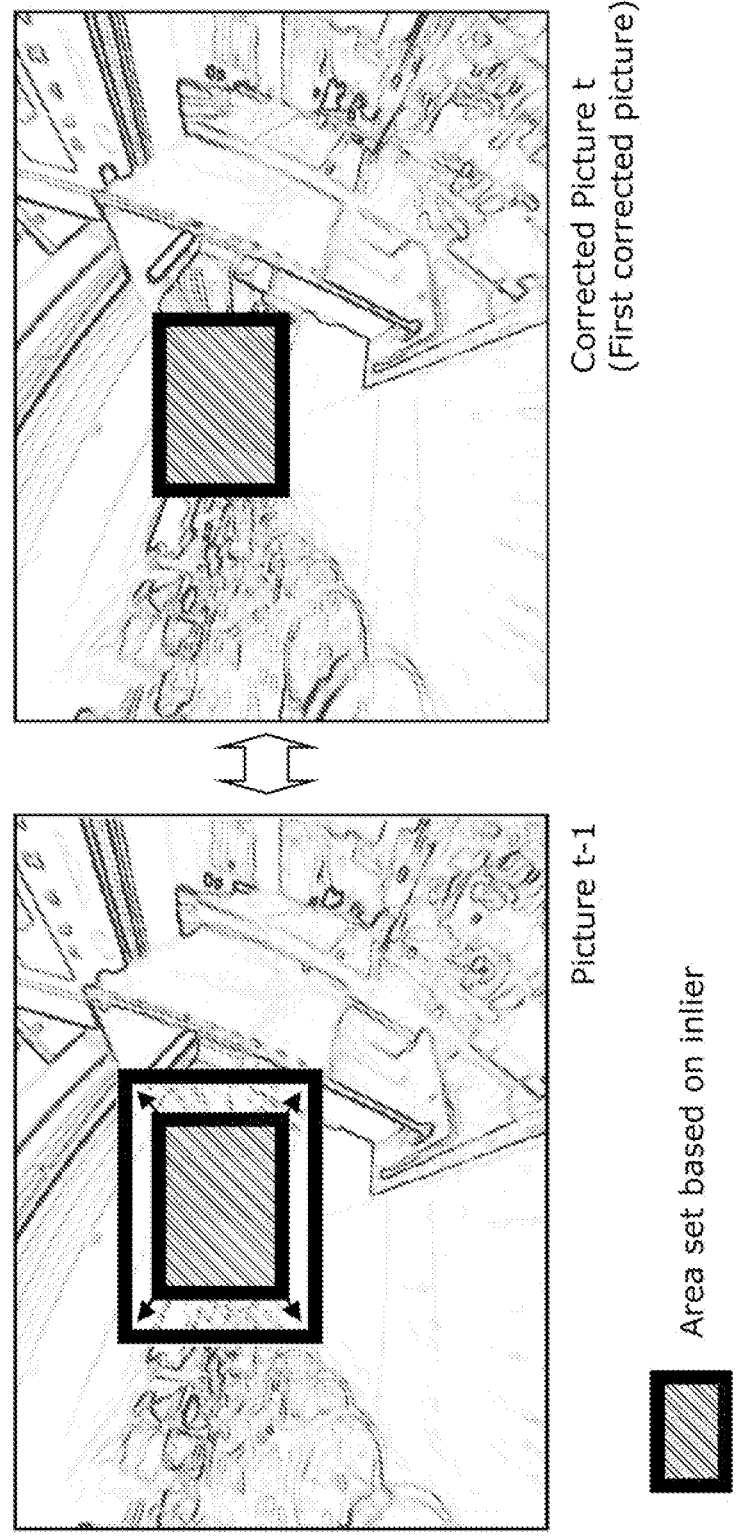
FIG. 4 exemplifies areas which are set based on inliers and to be used for post-processing.

FIG. 4 exemplifies areas which are set based on inliers and to be used for post-processing. Here, in FIG. 4, the area on the left (Picture t−1) is set larger than that on the right (corrected Picture t). Taking into consideration an error to develop in the coordinates of the inliers, one area is set larger than the other. This makes it easy in the post-processing to compare the displacement on the Picture t−1 with the displacement on the corrected Picture t. Having a larger area is a tradeoff between such a benefit and a calculation cost in the post-processing. Preferably, the area is set larger not more than two to three percents, according to the amount of an error to develop after feature point matching.

It is noted that the techniques below exemplify how the post-processing area setting unit 232 sets an area based on a certain number of inliers or more. The techniques below include: a technique to set a certain area having, as the center, the center of gravity coordinates of multiple inliers; a technique to set a specific area in a picture, and determine a certain area having, as the center, the center of gravity coordinates of multiple inliers included in the specific area; a technique to set a certain filed having, as the center, the center of gravity coordinates of multiple inliers included in an area with a specific color; and a technique to set a certain area having, as the center, the center of gravity coordinates of multiple inliers included in an area of a specific object. In employing any of the given techniques, the post-processing area setting unit 232 sets an area based on corrected coordinates of each of the inliers in Picture t. Here, the correction of the coordinates is actually made based on the amount of shake found between the frames (between pictures) and estimated by the feature point matching unit 223.

That is how the area setting unit 23 is structured.

Figure 5:
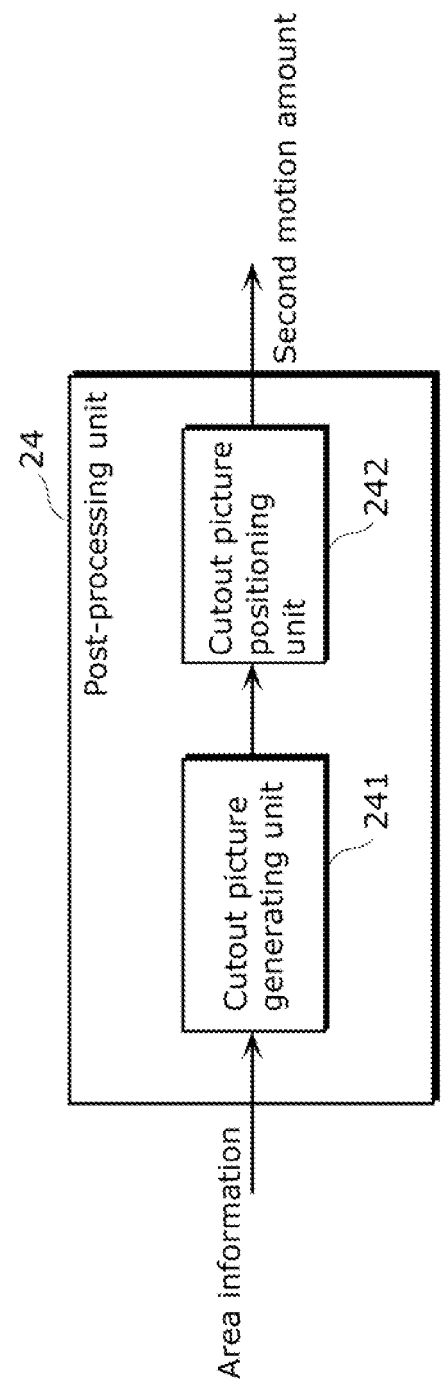
FIG. 5 depicts a block diagram showing a structure of a post-processing unit according to Embodiment 1 of the present invention.

As shown in FIG. 5, the post-processing unit 24 includes a cutout picture generating unit 241 and a cutout picture positioning unit 242. FIG. 5 depicts a block diagram showing a structure of a post-processing unit according to Embodiment 1 of the present invention.

The post-processing unit 24 generates a first cutout picture from an area set in the first picture, and a second cutout picture from an area set in the first corrected picture. Then, the post-processing unit 24 performs post-processing to estimate a second motion amount indicating a displacement amount of the second cutout picture with respect to the first cutout picture. Specifically, the post-processing unit 24 performs the post-processing based on two pictures (the first cutout picture and the second cutout picture). One picture includes an area of the corrected Picture t (second picture) set by the area setting unit 23, and the other picture includes an area of Picture t−1 (first picture). The area of Picture t−1 is set based on a value of coordinates of the area that is set in the corrected Picture t (second picture). As described before, the post-processing unit 24 performs the post-processing in order to improve accuracy in estimation by the feature point matching unit 223 of a shake amount between the frames (between pictures).

The cutout picture generating unit 241 generates (i) the first cutout picture by cutting out the area set in the first picture and (ii) the second cutout picture by cutting out the area set in the first corrected picture.

The cutout picture positioning unit 242 matches the area of the first cutout picture and the area of the second cutout picture (cutout picture positioning) with each other to estimate the second motion amount of the second cutout picture with respect to the first cutout picture.

It is noted that the specific processing by the post-processing unit 24 may include a translation estimation, a rotation estimation, and an inclination estimation, and a combination of the estimations. In other words, the second motion amount may be any of a translational motion amount, a rotational motion amount, and an inclination motion amount. For example, in the case where the second motion amount is the translational motion amount estimated through the translation estimation, a motion vector is calculated from two pictures; namely the first cutout picture and the second cutout picture, and a set of translational motion amount components x,y are estimated. Then, the following motion amount obtaining unit 25 combines (i) roll, pitch, yaw representing the rotational motion amount (first motion amount) estimated by the motion amount estimating unit 22 (specifically the feature point matching unit 223) and (ii) x,y representing the translational motion amount (second motion amount) estimated by the cutout picture positioning unit 242.

That is how the post-processing unit 24 is structured.

From the estimated first motion amount and second motion amount, the motion amount obtaining unit 25 obtains a motion amount indicating the displacement amount between the first picture and the second picture. Specifically, the motion amount obtaining unit 25 combines the first motion amount estimated by the post-processing unit 24 and the rotational motion amount estimated by the feature point matching unit 223 to obtain a motion amount indicating the shake amount of the images.

Here, the motion amount obtaining unit 25 may obtain the motion amount by transforming roll, pitch, yaw into a two-axis parameter represented in translational motion components x,y. Moreover, the motion amount obtaining unit 25 may either (i) obtain a three-axis parameter by transforming the translational motion amount components x,y into rotational motion amount components roll, pitch, yaw, or (ii) obtain a five-axis parameter represented in the motion amount components x,y and the rotational motion amount components roll, pitch, yaw.

For example, suppose the post-processing unit 24 performs the rotation estimation. Here, as the information on the feature points used by the feature point matching unit 223, an area-based evaluation function may be used to recalculate the rotational motion amount instead of the point-based which is used by the feature point matching unit 223. This is because the positions of the feature points change often between pictures (frames), which causes deterioration in estimation accuracy. Here, the post-processing unit 24 estimates an error of the shake amount estimated by the feature point matching unit 223 in the form of rotational motion components roll, pitch, yaw. Then, the motion amount obtaining unit 25 may combine the error with the shake amount estimated by the feature point matching unit 223 in order to consequently obtain a motion amount represented in a three-axis parameter.

Moreover, for example, the post-processing unit 24 may estimate an inclination due to the following reason: The shake amount estimated by the feature point matching unit 223 is technically a relative value between the frames (between pictures), and the obtained is a shake amount with respect to a frame (picture) used as the standard; however, the feature point matching unit 223 cannot obtain an absolute shake amount. In other words, the shake amount estimated by the feature point matching unit 223 has an estimation error. When the error is integrated, the resulting shake amount significantly differs from an actual shake amount.

When, such an error is integrated in roll, representing the inclination of a picture among the three parameters roll, pitch, yaw estimated by the feature point matching unit 223, the corrected picture inevitably inclines. Preferably, the error should be reset. This is the reason why inclination is to be estimated. Hence, when an angle of the inclination needs to be estimated from image processing so that the error in roll representing the inclination of picture is reset, the post-processing unit 24 estimates role; that is the inclination angle of the picture, based on segment information found on a structural object in the distant view area set by the area setting unit 23 and included in the picture. Then, the motion amount obtaining unit 25 adds only the roll estimated by the post-processing unit 24 to the shake amount to be estimated by the feature point matching unit 223 in order to consequently obtain a motion amount represented in a three-axis parameter. In the case of failure in estimating the inclination angle, the post-processing unit 24 sets 0 as the estimated motion amount.

This is how the motion amount obtaining unit 25 obtains a motion amount indicating the shake amount of an image.

The picture correcting unit 26 corrects a picture based on a motion amount (final corrected value) indicating a displacement amount (shake amount) (i) obtained by the motion amount obtaining unit 25, (ii) found between pictures, and (iii) used for correcting the displacement between the pictures. Specifically, using the motion amount (shake amount) obtained by the motion amount obtaining unit 25, the picture correcting unit 26 corrects displacement (shake amount) developed through a motion of the camera between pictures (frames); namely Picture t−1 (first picture) and Picture t (second picture).

For example, when the motion amount (shake amount) obtained by the motion amount obtaining unit 25 is represented in translational motion amount components; namely two axes of x,y, the picture correcting unit 26 translates Picture t (second picture) based on the obtained x,y in order to correct Picture t (second picture) with respect to Picture t−1 (first picture). Furthermore, when the motion amount (shake amount) obtained by the motion amount obtaining unit 25 is represented in rotational motion amount components; namely three axes of roll, pitch, yaw, the picture correcting unit 26 corrects Picture t (second picture) through the affine transform using the obtained roll, pitch, yaw. Moreover, for example, when the motion amount (shake amount) obtained by the motion amount obtaining unit 25 is represented in five axes such as translational motion amount components and rotational motion amount components; namely x,y, and roll, pitch, yaw, the picture correcting unit 26 corrects Picture t (second picture) by translation based on x,y, and the affine transform based on roll, pitch, yaw.

Described next is a flow of processing performed on the image processing device 20.

Figure 6:
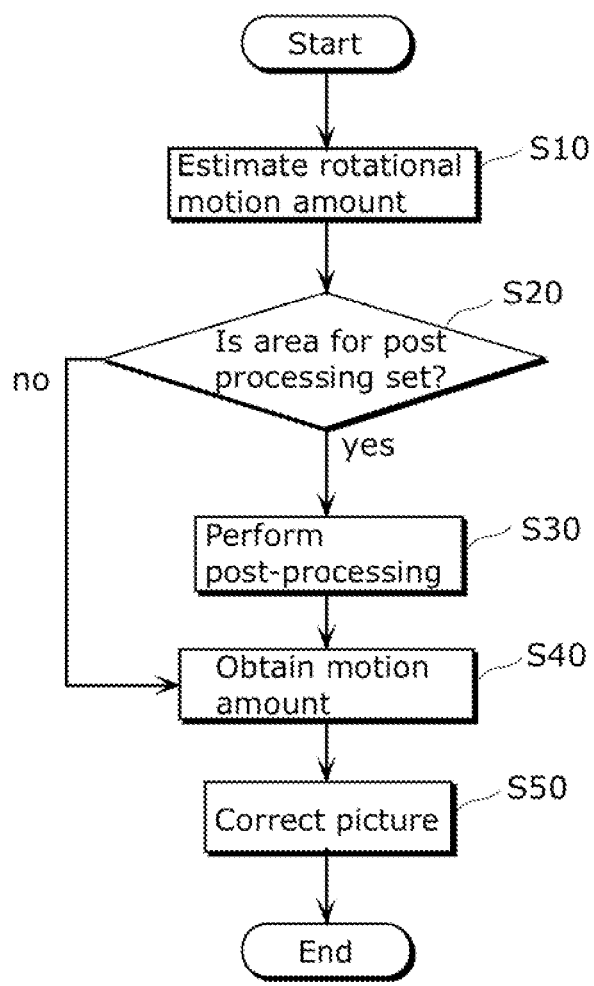
FIG. 6 depicts a flowchart showing a flow of processing by the image processing device according to Embodiment 1 of the present invention.
Figure 7:
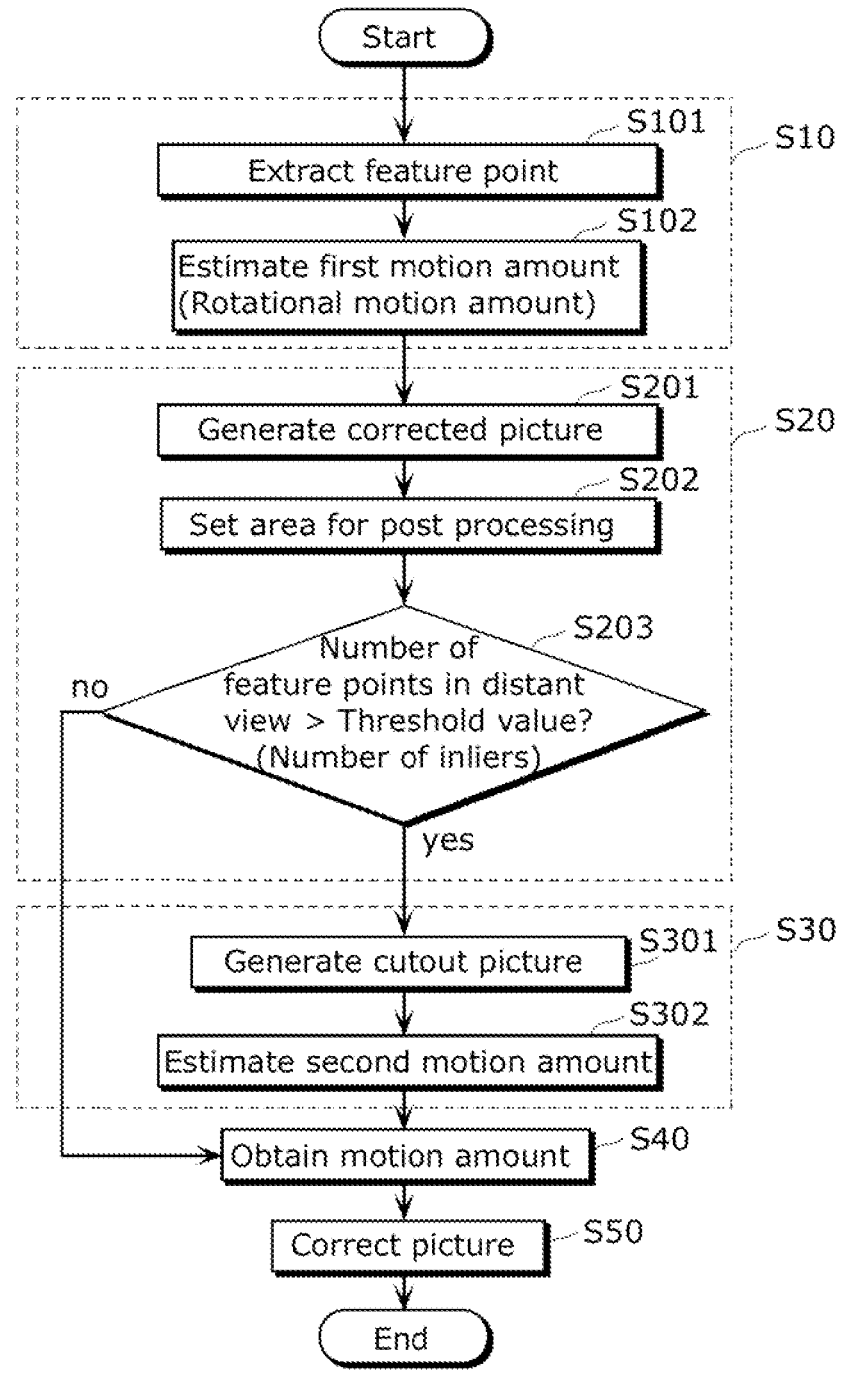
FIG. 7 depicts a flowchart showing a flow of the processing by the image processing device according to Embodiment 1 of the present invention.
Figure 8A:
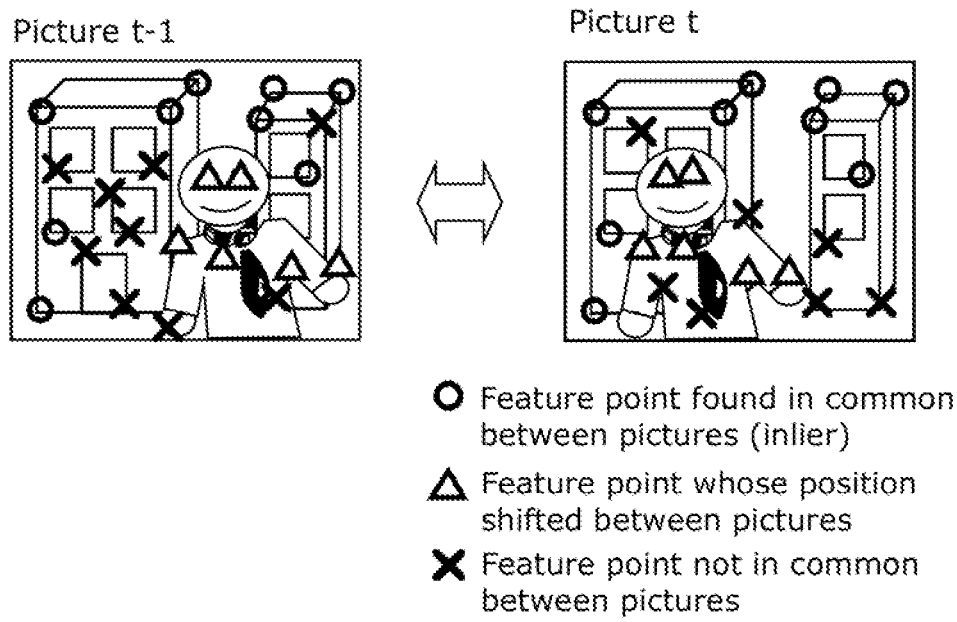
FIG. 8A shows the processing by the image processing device according to Embodiment 1 of the present invention.
Figure 8B:
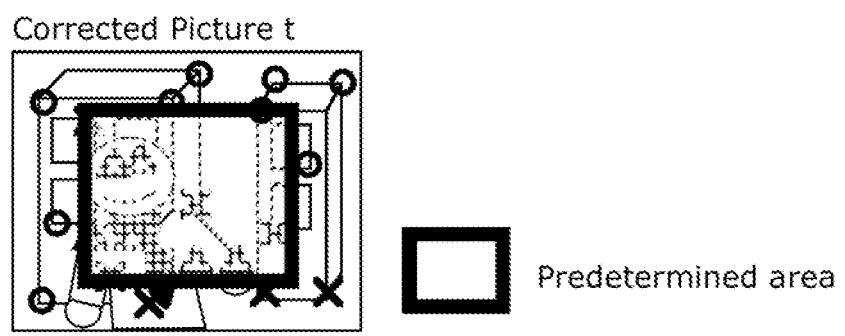
FIG. 8B shows the processing by the image processing device according to Embodiment 1 of the present invention.
Figure 8C:
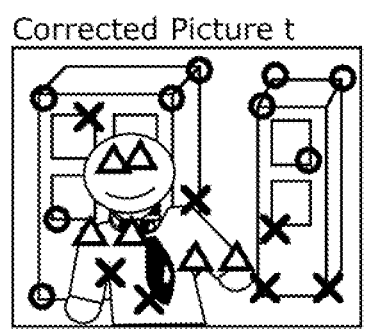
FIG. 8C shows the processing by the image processing device according to Embodiment 1 of the present invention.

FIGS. 6 and 7 depict flowcharts showing flows of processing by the image processing device 20 according to Embodiment 1 of the present invention. FIGS. 8A to 8C show the processing by the image processing device 20 according to Embodiment 1 of the present invention.

First, the image processing device 20 causes the picture obtaining unit 21 to obtain picture data to be processed. Specifically, the picture obtaining unit 21 reads picture data of Picture t and picture data of Picture t−1 both obtained from the imaging device 10.

Figure 9A:
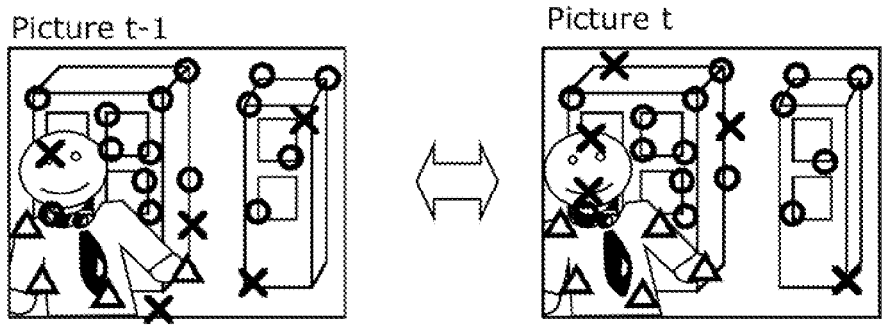
FIG. 9A shows the processing by the image processing device according to Embodiment 1 of the present invention.

Next, the motion amount estimating unit 22 estimates a rotational motion amount indicating a displacement amount (i) of the second picture with respect to the first picture, and (ii) in the combination of the three-axis rotational directions (S10). Here, the second picture is captured temporally after the first picture. Specifically, the feature point extracting unit 221 extracts feature points from each of the first picture and the second picture (S101). The distortion correcting unit 222 corrects distortion (i) developed due to optical strain of an optical system used for capturing and (ii) found between the feature points of the first picture and the feature points of the second picture. Here, the feature points are extracted by the feature point extracting unit 221. Then, the feature point matching unit 223 matches the feature points of the second picture and the feature points of the first picture with each other, and estimates the rotational motion amount indicating the rotational displacement amount of the second picture with respect to the first picture (S102). The rotational displacement amount is obtained based on the combination of axis rotational directions of the three axes. The feature points of first picture and the feature points of the second picture have the distortion corrected by the distortion correcting unit 222. Specifically, in S102, the feature point matching unit 223 matches the feature point data t of Picture t and the feature point data t−1 of Picture t−1 with each other; that is, the feature point matching unit 223 estimates a corresponding relationship between the feature point data t−1 and t as shown in FIGS. 8A and 9A. Then, the feature point matching unit 223 estimates the rotational motion amount (for example rotational components of roll, pitch, yaw) of the Picture t−1 with respect to the Picture t, based on common feature points (inlier represented in O). It is noted that each of FIGS. 8A and 9A shows a different example showing types of feature points extracted from Picture t−1 and Picture t.

Figure 9B:
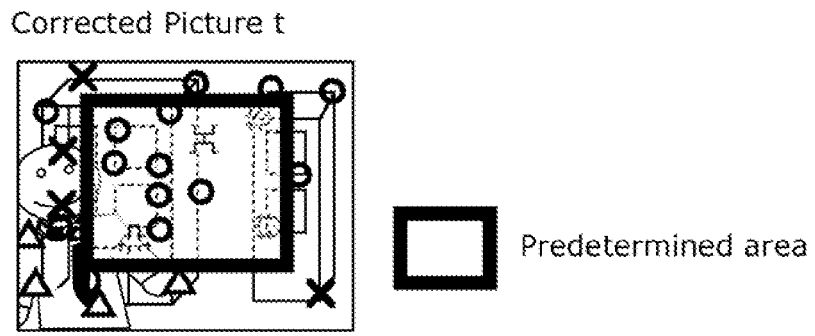
FIG. 9B shows processing by the image processing device according to Embodiment 1 of the present invention.
Figure 9C:
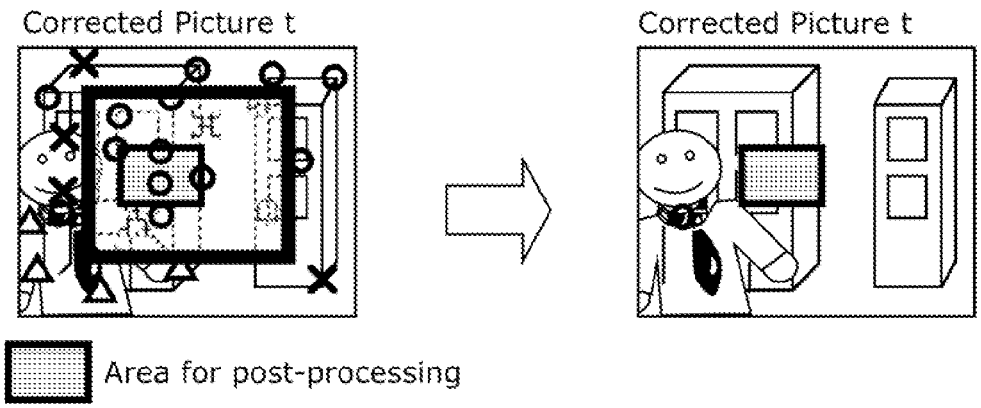
FIG. 9C shows the processing by the image processing device according to Embodiment 1 of the present invention.

Next, based on the feature points extracted from the first picture and the second picture, the area setting unit 23 sets an area to be used for post-processing for each of the first picture and the first corrected picture (S20). Here, the first corrected picture is generated from the second picture whose displacement is corrected according to the estimated rotational motion amount. Specifically, using the first motion amount estimated by the motion amount estimating unit 22, the corrected picture generating unit 231 generates the first corrected picture from the second picture whose displacement is corrected (S201). Then, the post-processing area setting unit 232 sets an area for each of the first picture and the first corrected picture as shown in one of FIGS. 8B and 9B, for example, using first feature points (inlier) (i) found among the feature points extracted from the first picture and the second picture and (ii) used when the motion amount estimating unit 22 estimates the first motion amount (S202). Here, each of FIGS. 8B and 9B shows a different example showing that the corrected Picture t has an area temporarily set by the post-processing area setting unit 232 for post-processing. Next, the determining unit 233 determines whether or not the area set by the post-processing area setting unit 232 in the first corrected picture includes as many first feature points (inlier) as a threshold value or more (S203). In the case where the determination result shows that the area includes the first feature points greater than or equal to the threshold value, the determining unit 233 determines that the inliers in the area are feature points in a distant view, and sets the area as an area for the post-processing as shown in FIG. 9C. Then, the operation proceeds to S30. Here, FIG. 9C shows that the area, which is set in the corrected Picture t for post-processing, meets the requirement so that a post-processing area is set. It is noted that, in the case where the determination result shows that the area does not include the first feature points (feature points in a distant view also referred to as inlier) greater than or equal to the threshold value, the determining unit 233 determines that the inlier in the area is not the feature points in a distant view, and informs the motion amount obtaining unit 25 that no processing is performed (thus, providing a zero value, for example) by the post-processing unit 24 (See FIG. 8C, for example). Here, FIG. 8C shows that the area, which is set in the corrected Picture t for post-processing, does not meet the requirement so that a post-processing area is not set.

Then, the post-processing unit 24 generates the first cutout picture from the first picture and the second cutout picture from the first corrected picture, and performs post-processing to estimate the second motion amount indicating a displacement amount of the second cutout picture with respect to the first cutout picture (S30). Here, the first cutout picture and the second cutout picture are the areas set by the area setting unit 23. Specifically, the cutout picture generating unit 241 generates the first cutout picture from the first picture and the second cutout picture from the first corrected picture (S301). Here, the first and second cutout pictures are the areas set by the area setting unit 23. The cutout picture positioning unit 242 matches the area of the first cutout picture and the area of the second cutout picture (cutout picture positioning) with each other to estimate the second motion amount of the second cutout picture with respect to the first cutout picture (S302). Here, the first cutout picture and the second cutout picture are generated by the cutout picture generating unit 241.

Next, from the estimated first motion amount and second motion amount, the motion amount obtaining unit 25 obtains a motion amount indicating the displacement amount between the first picture and the second picture. It is noted that in the case where the determining unit 233 informs the motion amount obtaining unit 25 that no processing is performed by the post-processing unit 24, the motion amount obtaining unit 25 obtains the motion amount indicating the displacement amount between the first picture and the second picture, setting the second motion amount to a zero value.

Then, using the motion amount obtained by the motion amount obtaining unit 25, the picture correcting unit 26 corrects the displacement (shake amount) developed through a motion of the camera and occurring between pictures; namely Picture t−1 (first picture) and Picture t (second picture). In other words, the picture correcting unit 26 corrects displacement of the image using the motion amount obtained by the motion amount obtaining unit 25.

That is how the image processing device 20 performs the processing.

As described above, the coordinates of an inlier estimated through the feature point matching and found between Picture t−1 (first picture) and Picture t (second picture) highly likely include an error. Hence, the first motion amount (rotational motion amount) estimated by the motion amount estimating unit 22 highly likely include an error. This is why the post-processing unit 24 in Embodiment 1 is provided to estimate the second motion amount in order to reduce the error in the first motion amount (rotational motion amount). Specifically, the image processing device 20 sets the area for the post-processing in the image processing based on the inlier, of the feature points in a long distance view, used when the first motion amount (rotational motion amount) is estimated. This feature contributes to correcting displacement of an image.

Consequently, the image processing device 20 and an image processing method for the image processing device successfully corrects in high accuracy a shake amount between multiple pictures obtained by temporally-continuous capturing.

It is noted that, in Embodiment 1, the image processing device 20 includes the image processing unit 20a and the picture obtaining unit 21; however, the structure of the image processing device 20 shall not be limited to this. The image processing device 20 may at least include the image processing unit 20a. The image processing device 20 may at least include the image processing unit 20a so that the image processing device 20 to successfully correct in high accuracy a shake amount between multiple pictures obtained by temporally-continuous capturing.

Embodiment 2

Embodiment 1 involves estimating the first motion amount (rotational motion amount) by motion amount estimating unit 22 to perform image processing; however, Embodiment 2 shall not be limited to this technique. The first motion amount (rotational motion amount) may be simultaneously estimated by a sensor. Described hereinafter are an image processing device and an image processing method in Embodiment 2 of the present invention, with reference to the drawings.

Figure 10:
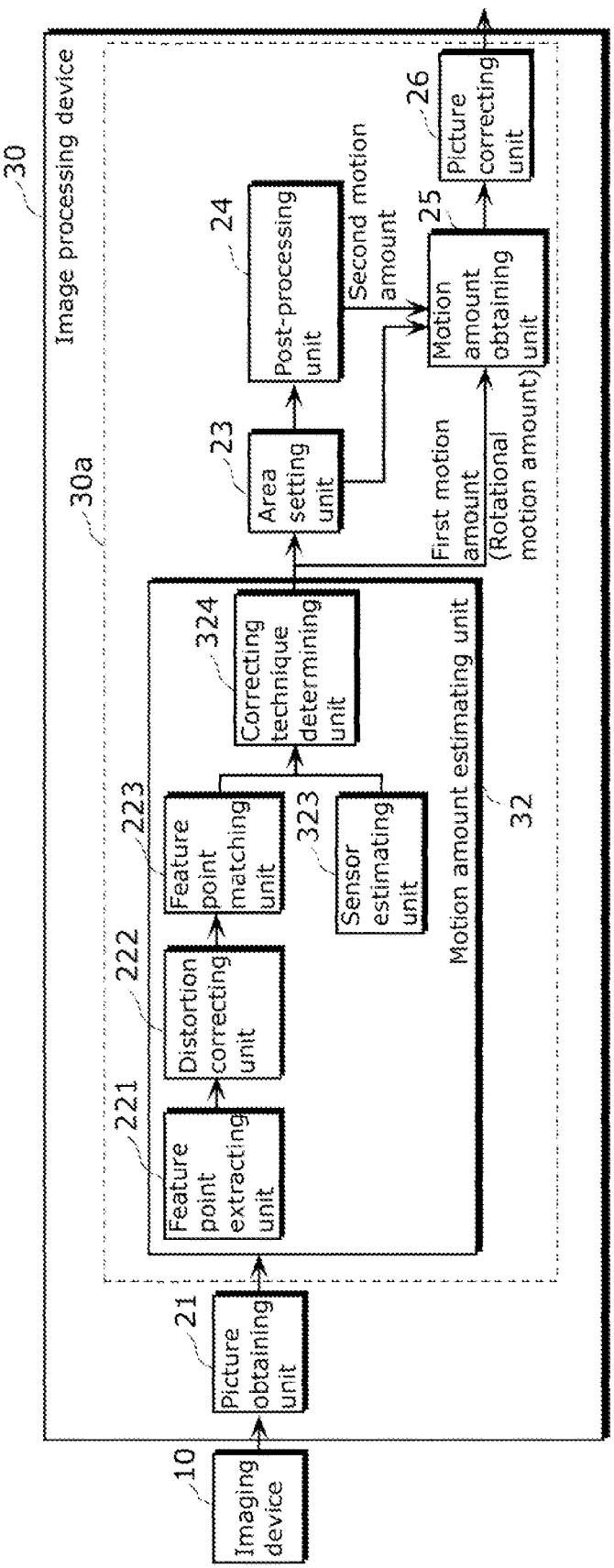
FIG. 10 depicts a block diagram showing an overall structure of an image processing device according to Embodiment 2 of the present invention.

FIG. 10 depicts a block diagram showing an overall structure of an image processing device according to Embodiment 2 of the present invention. The constituent elements in FIG. 10 similar to those in FIG. 2 share the same numerical references with each other. Hence, described here are constituent elements different from those in FIG. 2.

An image processing unit 30a according to Embodiment 2 in FIG. 10 differs from the image processing unit 20a according to Embodiment 1 in FIG. 3 in structure of the motion amount estimating unit. Specifically, compared with the motion amount estimating unit 22 according to Embodiment 1, a motion amount estimating unit 32 according to Embodiment 2 further includes a sensor estimating unit 323, and a correcting technique determining unit 324.

The sensor estimating unit 323 measures either an angle of rotation about an axis of the optical system used for capturing or an angle of rotation about at least one of two axes perpendicular to each other with respect to the axis of the optical system, and estimates the measured angle of rotation as a first motion amount of the second picture with respect to the first picture. Here, the first motion amount is obtained based on the combination of the three-axis rotational directions. Specifically, the sensor estimating unit 323 uses a sensor to estimate a shake amount (rotational motion amount obtained based on the combination of three-axis rotational directions) of a camera between pictures (frames). Here, the sensor estimating unit 323 includes at least one of an angular acceleration sensor, an angular velocity sensor, an acceleration sensor, a gyroscope, and a direction sensor. It is noted that one of or a combination of the above sensors measures a shake amount (rotational motion amount obtained based on the combination of three-axis rotational directions) of a camera developed between pictures (frames).

The correcting technique determining unit 324 determines the first motion amount, estimated by either the feature point matching unit 223 or the sensor estimating unit 323, to be used for correcting displacement between the pictures, and provides the determined first motion amount to the area setting unit 23 and the motion amount obtaining unit 25. Specifically, in the case where the determining unit 233 determines that the result of the image processing is not applicable, the correcting technique determining unit 324 determines whether or not the shake amount (motion amount) estimated by the sensor estimating unit 323 between the pictures (frames) is applicable. Specifically, using a sensor such as an acceleration sensor and a gyroscope, the correcting technique determining unit 324 observes the motion appearing between the pictures (frames) or among the pictures (among the frames) in order to determine whether or not to use the shake amount (motion amount) estimated by the sensor estimating unit 323.

It is noted that in observing the motion appearing between the pictures (frames) or among the pictures (among the frames), the correcting technique determining unit 324 can determine that the camera shake amount (rotational motion amount) is larger as a value of the sensor varies greater among, for example, the pictures (among the frames). Thus, when the value of the sensor varies greatly, the correcting technique determining unit 324 may determine not to use the shake amount (motion amount) estimated by the sensor estimating unit 323 for correction, since the use of such a shake amount deteriorates accuracy of the sensor. In contrast, when a motion of the sensor is stable, the correcting technique determining unit 324 may find that the camera is in a motionless state, and determine to use the shake amount (motion amount) estimated by the sensor estimating unit 323 for correction.

That is how an image processing device 30 is structured.

It is noted that the inlier; that is the feature points in a long distance view obtained by the feature point matching unit 223, can be used also in Embodiment 2. Thus, the inlier allows the area setting unit 23 to set an area and calculate in high accuracy the motion amount (shake amount) through post-processing.

Described next is a flow of the processing by the image processing device 30 according to Embodiment 2.

Figure 11:
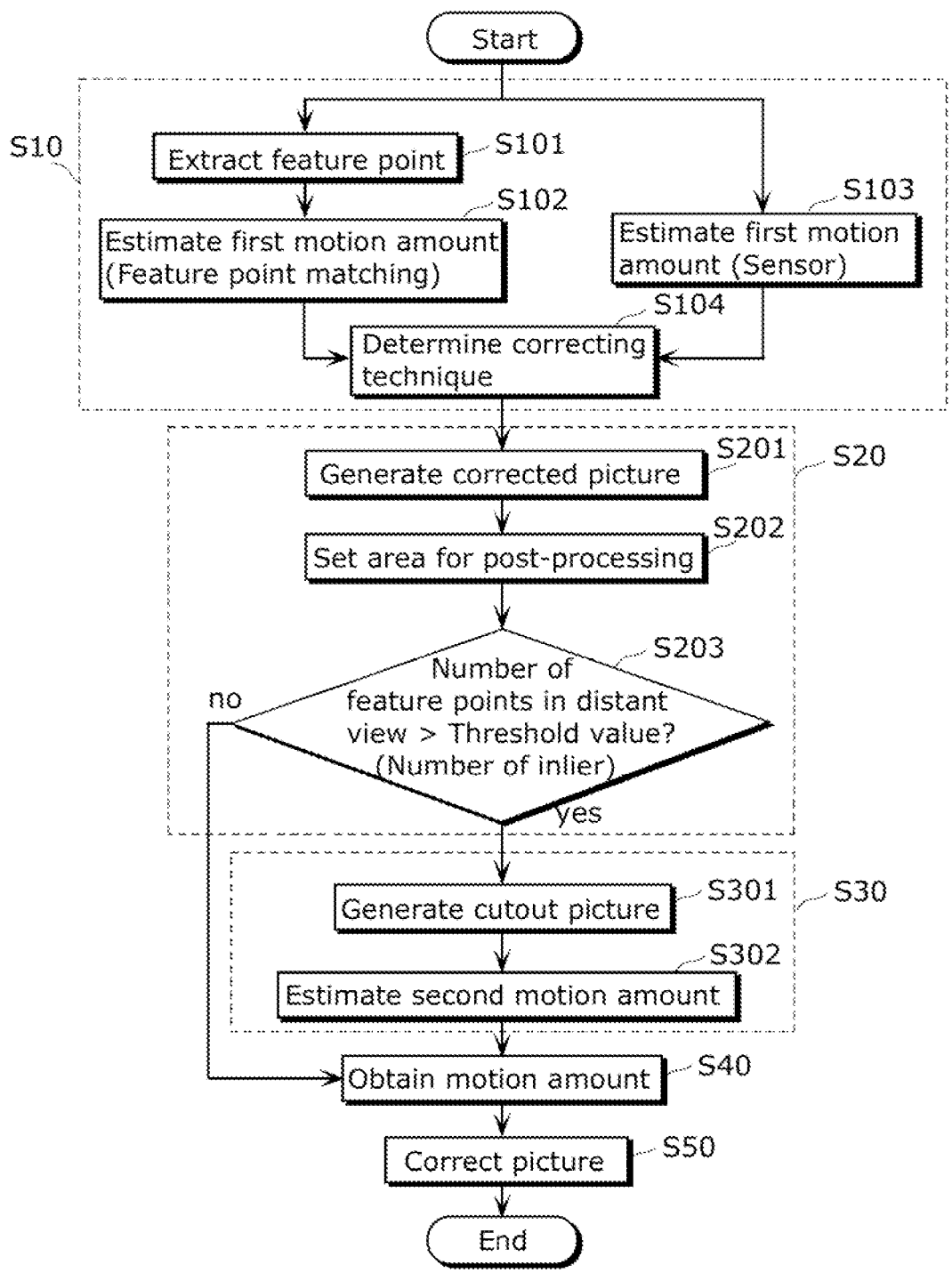
FIG. 11 depicts a flowchart showing a flow of processing by the image processing device according to Embodiment 2 of the present invention.

FIG. 11 depicts a flowchart showing a flow of processing by the image processing device 30 according to Embodiment 2 of the present invention. It is noted that the elements similar to those in FIG. 7 share the same numerical references with each other. Thus, the details thereof shall be omitted.

Specifically, in S10, the feature point matching unit 223 in the motion amount estimating unit 32 estimates the first motion amount (rotational motion amount) in S101 and S102. Simultaneously, the sensor estimating unit 323 in the motion amount estimating unit 32 estimates the first motion amount (rotational motion amount). Then, the correcting technique determining unit 324 in motion amount estimating unit 32 determines the first motion amount, estimated by either the feature point matching unit 223 or the sensor estimating unit 323, to be used for correcting the displacement between pictures. Then, the correcting technique determining unit 324 provides the determined first motion amount to the area setting unit 23 and the motion amount obtaining unit 25 (S104).

The following steps S20 to S50 are similar to those in Embodiment 1. Thus, the details thereof shall be omitted.

That is how the image processing device 30 performs the processing.

Hence, Embodiment 2 involves setting an area for post-processing in image processing based on an inlier of feature points in a long distance view, the inlier being used when the first motion amount (rotational motion amount) is estimated. This feature makes it possible to implement the image processing device which is capable of correcting in high accuracy a shake amount between pictures obtained by temporally-continuous capturing, and an image processing method for the image processing device.

Embodiment 3

Embodiment 3 exemplifies the case where a fisheye optical system is used to capture images which are pictures obtained by temporally-continuous capturing. Described hereinafter are an image processing device and an image processing method in Embodiment 3 of the present invention, with reference to the drawings.

Figure 12:
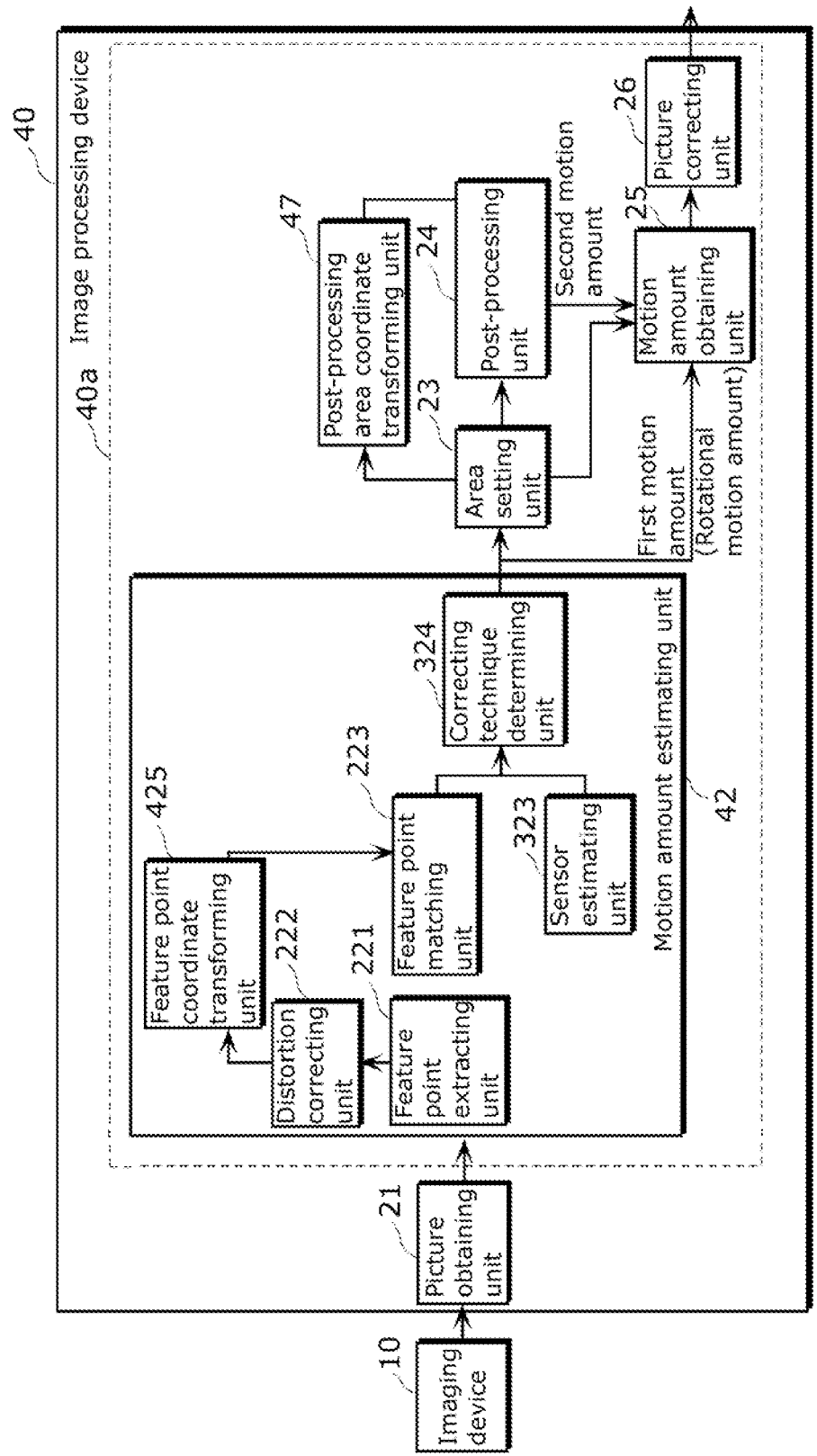
FIG. 12 depicts a block diagram showing an overall structure of an image processing device according to Embodiment 3 of the present invention.
Figure 13:
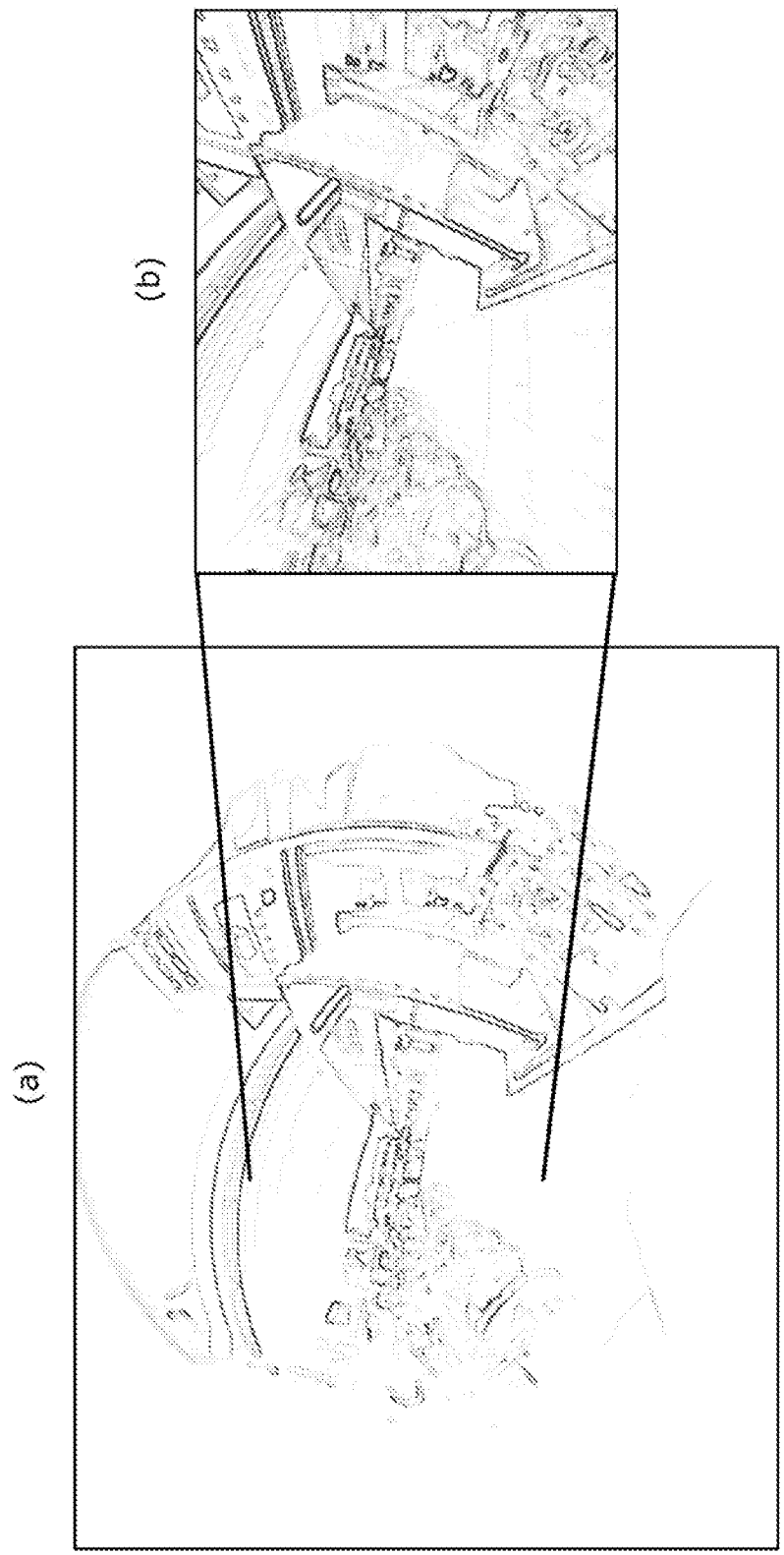
FIG. 13 exemplifies how an image processing device performs image processing in capturing with a fisheye optical system.

FIG. 12 depicts a block diagram showing an overall structure of an image processing device according to Embodiment 3 of the present invention. The constituent elements in FIG. 12 similar to those in FIG. 2 or in FIG. 10 share the same numerical references with one another. Hence, described here are constituent elements different from those in either FIG. 2 or in FIG. 10. FIG. 13 exemplifies how an image processing device 40 performs image processing in capturing with a fisheye optical system. An image in (a) in FIG. 13 shows a picture captured with a fisheye lens. An image in (b) in FIG. 13 shows a part of the picture cut out from the image (a) in FIG. 13.

An image processing unit 40a according to Embodiment 3 in FIG. 12 differs from the image processing unit 30a according to Embodiment 2 in FIG. 10 in that the image processing unit 40a further includes a feature point coordinate transforming unit 425 and a post-processing area coordinate transforming unit 47.

Embodiments 1 and 2 exemplify the cases where the optical systems have either a regular angle of view or a wide angle of view to capture images which are pictures obtained by temporally-continuous capturing. In contrast, Embodiment 3 exemplifies the case where a fisheye optical system, such as a fisheye lens, is used to capture images which are pictures obtained by temporally-continuous capturing.

As shown in the image (a) in FIG. 13 captured with a fisheye lens, the fisheye lens differs from an optical system having a regular angle of view in projection technique. Such a difference alters a traveling route of incident light from outside into the lens, depending on the adopted projection technique. When a shake amount of the camera between pictures (frames) is estimated in image processing, it is necessary to know how the camera has moved with respect to the world coordinate. In other words, in order to obtain a correct camera shake amount, it is necessary to know that each pixel is obtained from which position in the world coordinate. Consequently, coordinates need to be transformed based on the projection technique utilized for the fisheye lens (image (b) in FIG. 13, for example).

The feature point coordinate transforming unit 425 transforms coordinates of feature points of the first picture and feature points of the second picture into coordinates which are based on the projection technique of a fisheye optical system. Here, the feature points of the first and second picture are extracted by the feature point extracting unit 221. Specifically, when a fisheye optical system is used to capture pictures obtained by temporally-continuous capturing, the feature point coordinate transforming unit 425 transforms coordinates of feature points in the captured pictures into coordinates of feature points used in the projection technique adopted for the fisheye lens. In response to the transformation, the feature point matching unit 223 matches the feature points of the first picture and the feature points of the second picture with each other to estimate the motion amount indicating the displacement amount of the second picture with respect to the first picture. Here, the first and second pictures have their coordinates transformed by the feature point coordinate transforming unit 425.

It is noted that the reason for the coordinate transformation is that the coordinates of the feature points differ in positions between feature point coordinates in the world coordinate and feature point coordinates obtained from an input picture by the projection technique adopted for an ultra-wide fisheye-optical system. Thus, in order to estimate a correct camera shake amount from a picture, it is necessary to match the positions of feature point coordinates in the world coordinate and the positions of feature point coordinates obtained from an input picture. Here, the feature point coordinate transforming unit 425 performs inverse transformation of the projective transformation on the feature point coordinates obtained from the input picture. It is noted that the coordinate transformation is performed on coordinates of an inlier of feature points in a long distance view, and the inlier is obtained by the feature point matching unit 223. The coordinate transformation may be performed not only on the coordinates of such an inlier of feature points in a long distance view; instead, the coordinate transformation may be performed on the coordinates throughout a picture.

The post-processing area coordinate transforming unit 47 transforms the coordinates of the areas to be used for post processing into coordinates which are based on the projection technique of a fisheye optical system. Here, each of the areas is set by the area setting unit 23 for the first picture and the first corrected picture. In other words, the post-processing unit 24 needs to estimate a shake amount for a cut out image; accordingly, the post-processing area coordinate transforming unit 47 transforms for post-processing the coordinates of the areas set by the area setting unit 23. In response to the transformation, the cutout picture generating unit 241 generates (i) a first cutout picture by cutting out the area set in a first picture and (ii) a second cutout picture by cutting out the area set in a first corrected picture. Here, each of the areas is used for the post processing and has the coordinates transformed by the post-processing area coordinate transforming unit 47. Hence, when corrected is a shake of an image captured with a fisheye lens, the cutout picture generating unit 241 cuts out a part of the image captured with the fisheye lens, and the image processing device 40 estimates a motion amount for correction.

Described next is a flow of the processing by the image processing device 40 according to Embodiment 3.

Figure 14A:
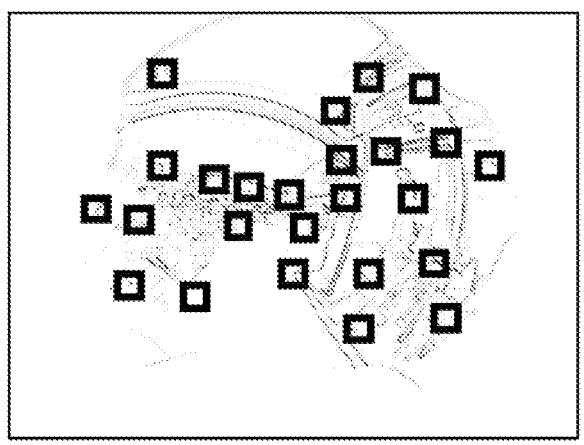
FIG. 14A exemplifies how the image processing device performs the image processing in capturing with the fisheye optical system.
Figure 14B:
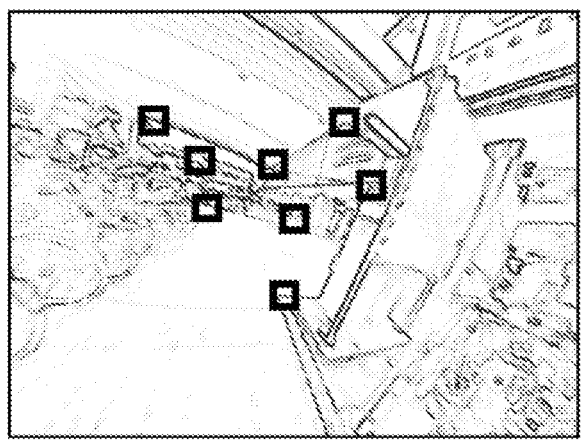
FIG. 14B exemplifies how the image processing device performs the image processing in capturing with the fisheye optical system.
Figure 14C:
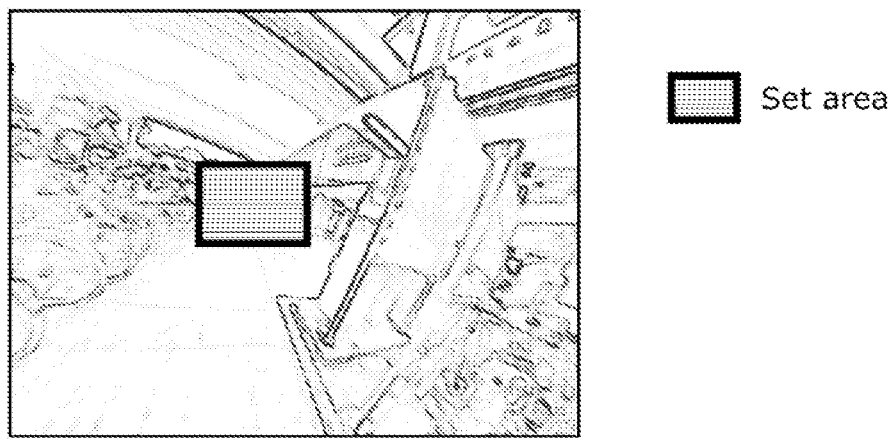
FIG. 14C exemplifies how the image processing device performs the image processing in capturing with the fisheye optical system.

FIGS. 14A to 14C exemplify how the image processing device 40 performs image processing in capturing with a fisheye optical system. FIG. 14A shows a picture when feature points are extracted from the image (a) in FIG. 13. FIG. 14B shows a cut out picture which is a part of the image in (a) in FIG. 13 (first corrected picture) corrected based on the estimated shake amount. The cut out picture shows an extracted inlier; that is the feature points in a distant view near the center. FIG. 14C exemplifies the case where an area for the post-processing is set in the center of gravity coordinates of the inlier in FIG. 14B.

FIG. 15 depicts a flowchart showing a flow of processing by the image processing device 40 according to Embodiment 3 of the present invention. It is noted that the elements similar to those in FIGS. 7 and 11 share the same numerical references. Thus, the details thereof shall be omitted.

First, in S101 in S10, the feature point extracting unit 221 extracts feature points from the first picture and the second picture as shown in FIG. 14A. Next, in S101a, the feature point coordinate transforming unit 425 transforms coordinates of feature points in the first picture and of feature points in the second picture into coordinates which are based on the projection technique of a fisheye optical system. Here, the feature points in the first and second picture are extracted by the feature point extracting unit 221. Then, in S102a, the feature point matching unit 223 matches the coordinates of the feature points in the second picture and the coordinates of the feature points in the first picture. Thus, the feature point matching unit 223 estimates a motion amount indicating a displacement amount of the second picture with respect to the first picture. Here, the coordinates of the feature points in the first and second picture are transformed by the feature point coordinate transforming unit 425. Next, in the motion amount estimating unit 22, the correcting technique determining unit 324 determines either the first motion amount estimated by the feature point matching unit 223 or the first motion amount estimated by the sensor estimating unit 323 to be used for correcting displacement between pictures. Then, the correcting technique determining unit 324 provides the determined first motion amount to the area setting unit 23 and the motion amount obtaining unit 25 (S104).

Next, based on the feature points extracted from the first picture and the second picture, the area setting unit 23 sets an area to be used for post-processing for each of the first picture and the first corrected picture (S20). Here, the first corrected picture is generated from the second picture whose displacement is corrected according to the estimated rotational motion amount. In other words, based on the inlier (FIG. 14B, for example) found between the feature points in a long distance view and used when the first motion amount is estimated, the area setting unit 23 sets an area (FIG. 14C, for example) for post-processing in image processing.

Then, the post-processing area coordinate transforming unit 47 transforms the coordinates of the set areas to be used for post processing into coordinates which are based on the projection technique of a fisheye optical system (S25). Here, each of the areas is set by the area setting unit 23 for the first picture and the first corrected picture.

Then, in S30, the cutout picture generating unit 241 cuts out each of the areas (i) having the coordinates transformed by the post-processing area coordinate transforming unit 47 and (ii) used for post-processing for the first picture and the first corrected picture, so that the cutout picture generating unit 241 generates the first cutout picture and the second cutout picture (S301a).

It is noted that the following S302, S40, and S50 are similar to those in FIG. 7. Thus, the details thereof shall be omitted.

That is how the image processing device 40 performs the processing.

It is noted that the post-processing area coordinate transforming unit 47 is not necessary in the case where correction is made without cutting out a part of an image captured with a fisheye lens.

Hence, Embodiment 2 involves setting an area for post-processing in image processing using feature points in a long distance view (inlier), the feature points being used when the first motion amount (rotational motion amount) is estimated. This feature makes it possible to implement the image processing device which is capable of correcting in high accuracy a shake amount between pictures obtained by temporally-continuous capturing, and an image processing method for the image processing device.

Thus, the present invention successfully implements an image processing device which is capable of correcting in high accuracy a shake amount between pictures obtained by temporally-continuous capturing.

In some cases, estimation of the first motion distance and the second motion distance, indicating a rotational motion amount, can fail. In such a case, the first motion distance and the second motion distance may be set to zero.

Specifically, the image processing device of the present invention may further include a motion amount determining unit which determines, before the setting by the area setting unit 23, whether or not the first motion amount is successfully calculated. Here, in the case where the determination result shows that the first motion amount is successfully calculated, the motion amount determining unit provides the first motion amount to the area setting unit 23. In the case where the determination result shows that the calculation of the first motion amount fails, the motion amount determining unit may set the first motion amount to a zero value indicating that no displacement is found between pictures, and provide the zero value to the area setting unit 23 and the motion amount obtaining unit 25. Then, the motion amount determining unit may cause the motion amount obtaining unit 25 to determine, as the zero value, a motion amount indicating a displacement amount between the first picture and the second picture. Moreover, the image processing device of the present invention may include a post-processing determining unit provided after the post-processing unit 24 and determining whether or not the second motion amount is successfully calculated. Here, in the case where the determination result shows that the second motion amount is successfully calculated, the post-processing determining unit may provide the second motion amount to the motion amount obtaining unit 25. In the case where the determination result shows that the calculation of the second motion amount fails, the post-processing determining unit may set the second motion amount to a zero value indicating no displacement is found, and provide the zero value to the motion amount obtaining unit 25.

For the image processing device of the present invention, it does not matter when a picture to be corrected is captured. Furthermore, the image processing device is included in a digital still camera and a digital camcorder and corrects a captured picture on the spot; however, the feature of the image processing device shall not be limited to this. For example, the image processing device may be separately prepared in the form of an application in a personal computer. The image processing device may receive a captured picture via a cable directly connecting the computer with a recording device, such as a camera. The image processing device may also read picture data via a recording medium such as a secure digital (SD) card and a network.

Although only some exemplary embodiments of this invention have been described for the image processing device, the image processing method, and the program in detail above, the present invention shall not be limited to the embodiments. The present invention includes the following cases:

(1) Each of the aforementioned devices is, specifically, a computer system including a microprocessor, a ROM, a RAM, a hard disk unit, a display unit, a keyboard, a mouse, and so on. The RAM or hard disk unit stores a computer program. The devices achieve their functions through the microprocessor's operation according to the computer program. Here, the computer program is configured by combining instruction codes indicating instructions for the computer in order to achieve predetermined functions.

(2) Part or all of the constituent elements constituting the respective device may be configured from a single System-LSI (Large-Scale Integration). The System-LSI is a super-multi-function LSI manufactured by integrating constituent units on one chip. Specifically, the System-LSI is a computer system configured by including a microprocessor, a ROM, a RAM, or by means of a similar device. The RAM stores a computer program. The System-LSI performs its functions through the microprocessor's operation according to the computer program.

(3) Part or all of the constituent elements constituting the each of the apparatuses may be configured as an IC card which can be attached and detached from each apparatus or as a stand-alone module. The IC card or the module is a computer system configured from a microprocessor, a ROM, and a RAM. The IC card or the module may also be included in the aforementioned super-multi-function LSI. The IC card or the module achieves its function through the microprocessor's operation according to the computer program. The IC card or the module may also be implemented to be tamper-resistant.

(4) The present invention may be a method for the above functions. The present invention, may be a computer program for implementing the above method, using a computer, and may also be a digital signal including the computer program.

Furthermore, the present invention may also be implemented by storing the computer program or the digital signal in a computer readable recording medium such as a flexible disc, a hard disk, a CD-ROM, an MO, a DVD, a DVD-ROM, a DVD-RAM, a BD (Blu-ray Disc), and semiconductor memory. Furthermore, the present invention may also include the digital signal recorded in these recording media.

Furthermore, the present invention may also be implemented by the transmission of the aforementioned computer program or digital signal via a telecommunication line, a wireless or wired communication line, a network represented by the Internet, and data broadcast.

The present invention may also be a computer system including a microprocessor and memory, in which the memory stores the aforementioned computer program and the microprocessor operates according to the computer program.

Furthermore, by transferring the program or the digital signal by recording onto the aforementioned recording media, or by transferring the program or digital signal via the aforementioned network, execution using another independent computer system is also made possible.

(5) Accordingly, any given combination of the aforementioned embodiments and the modifications of the embodiments is included within the scope of this invention.

INDUSTRIAL APPLICABILITY

An image processing device of the present invention successfully corrects in high accuracy shake on an image, by setting an area for post-processing in image processing using feature points, in a long distance view, calculated though feature point matching. Such a feature is useful as an image correction processing device for a digital still camera, a camcorder, and a wearable camera, and for software in a personal computer.

REFERENCE SIGNS LIST

10 Imaging device
20, 30, and 40 Image processing device
20, 30a, and 40 Image processing unit
21 Picture obtaining unit
22 and 32 Motion amount estimating unit
23 Area setting unit
24 Post-processing unit
25 Motion amount obtaining unit
26 Picture correcting unit
47 Post-processing area coordinate transforming unit
221 Feature point extracting unit 222 Distortion correcting unit
223 Feature point matching unit
231 Corrected picture generating unit
232 Post-processing area setting unit
233 Determining unit
241 Cutout picture generating unit
242 Cutout picture positioning unit
323 Sensor estimating unit
324 Correcting technique determining unit
425 Feature point coordinate transforming unit

The invention claimed is:

1. An image processing device which corrects an amount of shake between pictures obtained by temporally-continuous capturing, the image processing device comprising:
  a motion amount estimating unit configured to estimate a first shake amount indicating a rotational displacement amount of a second picture with respect to a first picture, the rotational displacement amount being obtained based on a combination of axis rotational directions of mutually perpendicular three axes, and the second picture being captured temporally after the first picture;
  an area setting unit configured to set an area to be used for post-processing for each of the first picture and a first corrected picture, using feature points extracted from the first picture and the second picture, the first corrected picture being generated from the second picture whose displacement is corrected using the estimated first shake amount;
  a post-processing unit configured to perform the post-processing, by generating a first cutout picture and a second cutout picture and estimating a second shake amount indicating a displacement amount of the second cutout picture with respect to the first cutout picture, the first cutout picture being generated from the area set in the first picture and the second cutout picture being generated from the area set in the first corrected picture;
  a motion amount obtaining unit configured to obtain a shake amount indicating the amount of shake between the first picture and the second picture, from the estimated first shake amount and the estimated second shake amount; and
  a picture correcting unit configured to correct the amount of shake between the first picture and the second picture using the shake amount obtained by the motion amount obtaining unit,
  wherein the motion amount estimating unit includes:
    a feature point extracting unit configured to extract the feature points from each of the first picture and the second picture;
    a distortion correcting unit configured to correct distortion (i) developed due to optical strain of an optical system used for capturing and (ii) found between the feature points of the first picture and the feature points of the second picture, the feature points being extracted by the feature point extracting unit; and
    a feature point matching unit configured to match the feature points of the first picture and the feature points of the second picture with each other to estimate the first shake amount, the first picture and the second picture having the distortion corrected by the distortion correcting unit.

2. The image processing device according to claim 1, wherein the post-processing unit includes:
  a cutout picture generating unit configured to generate (i) the first cutout picture by cutting out the area set in the first picture and (ii) the second cutout picture by cutting out the area set in the first corrected picture; and
  a cutout picture positioning unit configured to match the area of the first cutout picture and the area of the second cutout picture with each other to estimate the second shake amount of the second cutout picture with respect to the first cutout picture.

3. The image processing device according to claim 2,
wherein the pictures are captured by a fisheye optical system,
  the motion amount estimating unit further includes a feature point coordinate transforming unit configured to transform coordinates of the feature points of the first picture and coordinates of the feature points of the second picture into coordinates to be used in a projection technique of the fisheye optical system, the feature points of the first picture and of the second picture being extracted by the feature point extracting unit, and
  the feature point matching unit is configured to match the feature points of the first picture and the feature points of the second picture with each other to estimate the first shake amount indicating the displacement amount of the second picture with respect to the first picture, the first picture and the second picture having the coordinates transformed by the coordinate transforming unit.

4. The image processing device according to claim 3, further comprising a post-processing area coordinate transforming unit configured to transform coordinates of the area to be used for the post-processing into coordinates to be used in the projection technique of the fisheye optical system, the area to be used for the post-processing being set in each of the first picture and the first corrected picture by the area setting unit,
  wherein the cutout picture generating unit is configured to generate (i) the first cutout picture by cutting out the area set in the first picture and (ii) the second cutout picture by cutting out the area set in the first corrected picture, the areas each of which being used for the post-processing and having the coordinates transformed by the post-processing area coordinate transforming unit.

5. The image processing device according to claim 1, wherein the area setting unit is configured to set the area to be used for the post-processing for each of the first picture and the first corrected picture, the area being set using feature points (i) found among the feature points extracted from the first picture and the second picture and (ii) used for estimating the first shake amount by the motion amount estimating unit.

6. The image processing device according to claim 5, wherein the area setting unit includes:
  a corrected picture generating unit configured to generate the first corrected picture generated from the second picture whose displacement is corrected using the first shake amount estimated by the motion amount estimating unit;
  a post-processing area setting unit configured to set an area for each of the first picture and the first corrected picture, using first feature points (i) found among the feature points extracted from the first picture and the second picture and (ii) used for estimating the first shake amount by the motion amount estimating unit; and
  a determining unit configured to (i) determine whether or not a number of the first feature points, included in the area for the first corrected picture, is greater than or equal to a threshold value and (ii) set the area for the first corrected picture as the area to be used for the post-processing in a case where a result of the determination shows that the number is greater than or equal to the threshold value.

7. The image processing device according to claim 5, wherein the feature points used for estimating the first shake amount are an inlier.

8. The image processing device according to claim 1, further comprising a sensor estimating unit configured to measure either an angle of rotation about an axis of the optical system used for the capturing or an angle of rotation about at least one of two axes perpendicular to each other with respect to the axis of the optical system, and estimate the measured angle of rotation as the first shake amount of the second picture with respect to the first picture, the first shake amount being obtained based on the combination of the axis rotational directions of the mutually perpendicular three axes.

9. The image processing device according to claim 8, wherein the sensor estimating unit includes at least one of an angular acceleration sensor, an angular velocity sensor, an acceleration sensor, and a direction sensor.

10. The image processing device according to claim 8, wherein the motion amount estimating unit further includes a correcting technique determining unit configured to (i) determine the first shake amount, estimated by either the feature point matching unit or the sensor estimating unit, to be used for correcting the amount of shake between the pictures and (ii) provide the determined first shake amount to the area setting unit and the motion amount obtaining unit.

11. The image processing device according to claim 1, further comprising a motion amount determining unit configured to determine, before the setting by the area setting unit, whether or not the first shake amount is successfully calculated,
wherein, in a case where a result of the determination by the motion amount determining unit shows that the first shake amount is successfully calculated, the motion amount determining unit is configured to provide the first shake amount to the area setting unit, and
in a case where the result of the determination by the motion amount determining unit shows that the calculation of the first shake amount fails, the motion amount determining unit is configured to set the first shake amount to a zero value indicating that no displacement is found, provide the zero value to the area setting unit and the motion amount obtaining unit, and cause the motion amount obtaining unit to determine, as the zero value, the first shake amount indicating the displacement amount between the first picture and the second picture.

12. The image processing device according to claim 1, further comprising a post-processing determining unit configured to determine, after the post-processing by the post-processing unit, whether or not the second shake amount is successfully calculated,
wherein, in a case where a result of the determination by the post-processing determining unit shows that the second shake amount is successfully calculated, the post-processing determining unit is configured to provide the second shake amount to the motion amount obtaining unit, and
in a case where the result of the determination by the post-processing determining unit shows that the calculation of the second shake amount fails, the post-processing determining unit is configured to set the second shake amount to a zero value indicating that no displacement is found, and provide the zero value to the motion amount obtaining unit.

13. An image processing method for correcting an amount of shake between pictures obtained by temporally-continuous capturing, the image processing device comprising:
estimating a first shake amount indicating a rotational displacement amount of a second picture with respect to a first picture, the rotational displacement amount being obtained based on a combination of axis rotational directions of mutually perpendicular three axes, and the second picture being captured temporally after the first picture;
setting an area to be used for post-processing for each of the first picture and a first corrected picture, using feature points extracted from the first picture and the second picture, the first corrected picture being generated from the second picture whose displacement is corrected using the estimated first shake amount;
performing the post-processing, by generating a first cutout picture and a second cutout picture and estimating a second shake amount indicating a displacement amount of the second cutout picture with respect to the first cutout picture, the first cutout picture being generated from the area set in the first picture and the second cutout picture being generated from the area set in the first corrected picture;
obtaining a shake amount indicating the amount of shake between the first picture and the second picture, from the estimated first shake amount and the estimated second shake amount; and
correcting the amount of shake between the first picture and the second picture using the shake amount obtained by the obtaining of the shake amount,
wherein the estimating includes:
extracting the feature points from each of the first picture and the second picture;
correcting distortion (i) developed due to optical strain of an optical system used for capturing and (ii) found between the feature points of the first picture and the feature points of the second picture, the feature points being extracted in the extracting; and
matching the feature points of the first picture and the feature points of the second picture with each other to estimate the first shake amount, the first picture and the second picture having the distortion corrected in the correcting.

14. A non-transitory computer-readable recording medium having a program recorded thereon, the program for causing a computer to correct an amount of shake between pictures obtained by temporally-continuous capturing, the computer correcting the amount of shake by executing a method comprising:
estimating a first shake amount indicating a rotational displacement amount of a second picture with respect to a first picture, the rotational displacement amount being obtained based on a combination of axis rotational directions of mutually perpendicular three axes, and the second picture being captured temporally after the first picture;
setting an area to be used for post-processing for each of the first picture and a first corrected picture, using feature points extracted from the first picture and the second picture, the first corrected picture being generated from the second picture whose displacement is corrected using the estimated first shake amount;
performing the post-processing, by generating a first cutout picture and a second cutout picture and estimating a second shake amount indicating a displacement amount of the second cutout picture with respect to the first cutout picture, the first cutout picture being generated from the area set in the first picture and the second cutout picture being generated from the area set in the first corrected picture;

obtaining a shake amount indicating the amount of shake between the first picture and the second picture, from the estimated first shake amount and the estimated second shake amount; and correcting the amount of shake between the first picture and the second picture using the shake amount obtained by obtaining of the shake amount, wherein the estimating includes:
- extracting the feature points from each of the first picture and the second picture;
- correcting distortion (i) developed due to optical strain of an optical system used for capturing and (ii) found between the feature points of the first picture and the feature points of the second picture, the feature points being extracted in the extracting; and
- matching the feature points of the first picture and the feature points of the second picture with each other to estimate the first shake amount, the first picture and the second picture having the distortion corrected in the correcting.

\* \* \* \* \*